(12) United States Patent
Porter et al.

(10) Patent No.: US 11,062,166 B2
(45) Date of Patent: *Jul. 13, 2021

(54) COMPUTER VISION SYSTEMS AND METHODS FOR GEOSPATIAL PROPERTY FEATURE DETECTION AND EXTRACTION FROM DIGITAL IMAGES

(71) Applicant: Geomni, Inc., Jersey City, NJ (US)

(72) Inventors: Bryce Zachary Porter, Lehi, UT (US); Ryan Mark Justus, Lehi, UT (US); John Caleb Call, Lehi, UT (US)

( * ) Notice: Subject to any disclaimer, the term of this patent is extended or adjusted under 35 U.S.C. 154(b) by 70 days.

This patent is subject to a terminal disclaimer.

(21) Appl. No.: 16/214,633

(22) Filed: Dec. 10, 2018

(65) Prior Publication Data

US 2019/0188516 A1 Jun. 20, 2019

Related U.S. Application Data

(60) Provisional application No. 62/596,172, filed on Dec. 8, 2017, provisional application No. 62/619,321, filed on Jan. 19, 2018.

(51) Int. Cl.
*G06K 9/46* (2006.01)
*G06K 9/00* (2006.01)
(Continued)

(52) U.S. Cl.
CPC ....... *G06K 9/4604* (2013.01); *G06K 9/00637* (2013.01); *G06K 9/3233* (2013.01);
(Continued)

(58) Field of Classification Search
CPC ............. G06K 9/4604; G06K 9/00637; G06K 9/3233; G06K 9/4652; G06K 9/4633;
(Continued)

(56) References Cited

U.S. PATENT DOCUMENTS 6,993,152 B2 * 1/2006 Patterson ........... H04N 21/8358
382/100
8,655,070 B1 2/2014 Yang et al.
(Continued)

OTHER PUBLICATIONS

International Search Report of the International Searching Authority dated Mar. 5, 2019, issued in connection with International Application No. PCT/US18/64690 (3 pages).
(Continued)

*Primary Examiner* — Kim Y Vu
*Assistant Examiner* — Molly Delaney
(74) *Attorney, Agent, or Firm* — McCarter & English, LLP

(57) ABSTRACT

Systems and methods for property feature detection and extraction using digital images. The image sources could include aerial imagery, satellite imagery, ground-based imagery, imagery taken from unmanned aerial vehicles (UAVs), mobile device imagery, etc. The detected geometric property features could include tree canopy, pools and other bodies of water, concrete flatwork, landscaping classifications (gravel, grass, concrete, asphalt, etc.), trampolines, property structural features (structures, buildings, pergolas, gazebos, terraces, retaining walls, and fences), and sports courts. The system can automatically extract these features from images and can then project them into world coordinates relative to a known surface in world coordinates (e.g., from a digital terrain model).

52 Claims, 19 Drawing Sheets

(51) Int. Cl.
*G06K 9/32* (2006.01)
*G06T 3/40* (2006.01)
*G06T 7/60* (2017.01)
*G06T 17/05* (2011.01)
*G06T 7/80* (2017.01)

(52) U.S. Cl.
CPC .............. *G06T 3/4038* (2013.01); *G06T 7/60* (2013.01); *G06T 7/80* (2017.01); *G06T 17/05* (2013.01)

(58) Field of Classification Search
CPC .............. G06K 9/00201; G06K 9/6271; G06T 3/4038; G06T 7/60; G06T 17/05; G06T 7/80; G06T 11/00
See application file for complete search history.

(56) References Cited

U.S. PATENT DOCUMENTS

| | | | |
|---|---|---|---|
| 10,726,558 | B2 | 7/2020 | Ruda et al. |
| 10,803,613 | B2 | 10/2020 | Porter et al. |
| 2012/0113225 | A1 | 5/2012 | Deppermann et al. |
| 2013/0329940 | A1* | 12/2013 | Nakamura ........... G06K 9/0063 382/100 |
| 2014/0019166 | A1* | 1/2014 | Swanson ................ G06Q 50/16 705/4 |
| 2016/0180746 | A1 | 6/2016 | Coombes et al. |
| 2017/0039765 | A1* | 2/2017 | Zhou ........................ G06T 7/55 |
| 2017/0076438 | A1* | 3/2017 | Kottenstette ........... G06K 9/627 |
| 2017/0206648 | A1* | 7/2017 | Marra .................. G05D 1/0038 |
| 2017/0282869 | A1 | 10/2017 | Tong et al. |
| 2019/0155973 | A1* | 5/2019 | Morczinek ........... G06K 9/0063 |
| 2019/0304026 | A1* | 10/2019 | Lyman ................. G06Q 50/165 |
| 2020/0020093 | A1* | 1/2020 | Frei ....................... G06K 9/6228 |
| 2020/0072610 | A1* | 3/2020 | Hofmann ........... G06K 9/00651 |
| 2020/0098130 | A1 | 3/2020 | Porter et al. |
| 2020/0226373 | A1* | 7/2020 | Kottenstette ......... G06K 9/4623 |

OTHER PUBLICATIONS

Written Opinion of the International Searching Authority dated Mar. 5, 2019, issued in connection with International Application No. PCT/US18/64690 (11 pages).

Eisenbeiss, "UAV Photogrammetry," Dissertation submitted to ETH Zurich (2009) retrieved on Nov. 14, 2019 https://www.research-collection.ethz.ch/handle/20.500.11850/20976> (98 pages).

International Search Report of the International Searching Authority dated Dec. 10, 2019, issued in connection with International Application No. PCT/US2019/052929 (3 pages).

Written Opinion of the International Searching Authority dated Dec. 10, 2019, issued in connection with International Application No. PCT/US2019/052929 (5 pages).

Notice of Allowance dated Apr. 9, 2020, issued in connection with U.S. Appl. No. 16/582,565 (12 pages).

Alcantarilla, et al., "KAZE Features," In European Conference on Computer Vision (ECCV), Fiorenze, Italy, Oct. 2012 (14 pages).

Ullman, S., "The Interpretation of Structure from Motion," Proceedings of the Royal Society of London, (1979) B-203, pp. 405-426 (22 pages).

Notice of Allowance dated Jun. 3, 2020, issued in connection with U.S. Appl. No. 16/582,565 (12 pages).

* cited by examiner

COMPUTER VISION SYSTEMS AND METHODS FOR GEOSPATIAL PROPERTY FEATURE DETECTION AND EXTRACTION FROM DIGITAL IMAGES

CROSS-REFERENCE TO RELATED APPLICATIONS

This application claims the benefit of U.S. Provisional Patent Application No. 62/619,321 filed on Jan. 19, 2018 and U.S. Provisional Patent Application No. 62/596,172 filed on Dec. 8, 2017, the entire disclosures of which are expressly incorporated herein by reference.

BACKGROUND

Technical Field

The present disclosure relates generally to the field of computer vision. More particularly, the present disclosure relates to computer vision systems and methods for geospatial property feature detection and extraction from digital images (e.g., from aerial images, satellite images, etc.).

Related Art

Accurate and rapid identification and estimation of objects in digital images such as aerial images, satellite images, ground-based images, etc., is increasingly important for a variety of applications. For example, information related to roofs of buildings is often used by construction professionals to specify materials and associated costs for both newly-constructed buildings, as well as for replacing and upgrading existing structures. Further, in the insurance industry, accurate information about construction materials and costs is critical to determining the proper costs for insuring buildings/structures. Still further, government entities can use information about the known objects in a specified area for planning projects such as zoning, construction, parks and recreation, housing projects, etc.

Various software systems have been implemented to process aerial images to identify building structures and associated features thereof. However, such systems are often time-consuming and difficult to use, and require a great deal of manual input by a user. Further, such systems require a specific image source and image type to function. Still further, such systems can only detect certain types of objects and can only detect roof features, not other objects in a scene such as trees, pools, bodies of water, landscaping, sport courts, etc.

In view of existing technology in this field, what would be desirable is a system that automatically and efficiently processes digital images, regardless of the source, to automatically detect and extract property features from such images.

SUMMARY

This present disclosure relates to computer vision systems and methods for property feature detection and extraction using digital images. The image sources could include, but are not limited to, aerial imagery, satellite imagery, ground-based imagery, imagery taken from unmanned aerial vehicles (UAVs), mobile device imagery, etc. The detected geometric property features could include, but are not limited to, tree canopy, pools and other bodies of water, concrete flatwork, landscaping classifications (gravel, grass, concrete, asphalt, etc.), trampolines, property structural features (structures, buildings, pergolas, gazebos, terraces, retaining walls, and fences), and sports courts. The system can automatically extract these features from images and can then project them into world coordinates relative to a known surface in world coordinates (e.g., from a digital terrain model).

The system of the present disclosure can also detect and extract non-geometric features from digital images. Such non-geometric property features could include, but are not limited to, roof materials, roof condition, roof age, and wall materials. These are classification features of properties that can be used to annotate existing structural geometries. The system of the present disclosure can automatically extracts these features/classifications from images and can project an existing 3D model of a structure on the classification results in order to annotate the structure geometry with such features/classifications. Alternatively, the features/classifications can be projected on an existing three dimensional model.

BRIEF DESCRIPTION OF THE DRAWINGS

The foregoing features of the invention will be apparent from the following Detailed Description, taken in connection with the accompanying drawings, in which.

DETAILED DESCRIPTION

The present disclosure relates to a computer vision systems and methods for geospatial property feature detection and extraction from digital images, as discussed in detail below in connection with FIGS. 1-19. As will be discussed in greater detail below, the system can detect and extract both geometric and non-geometric features from digital images.

Figure 1:
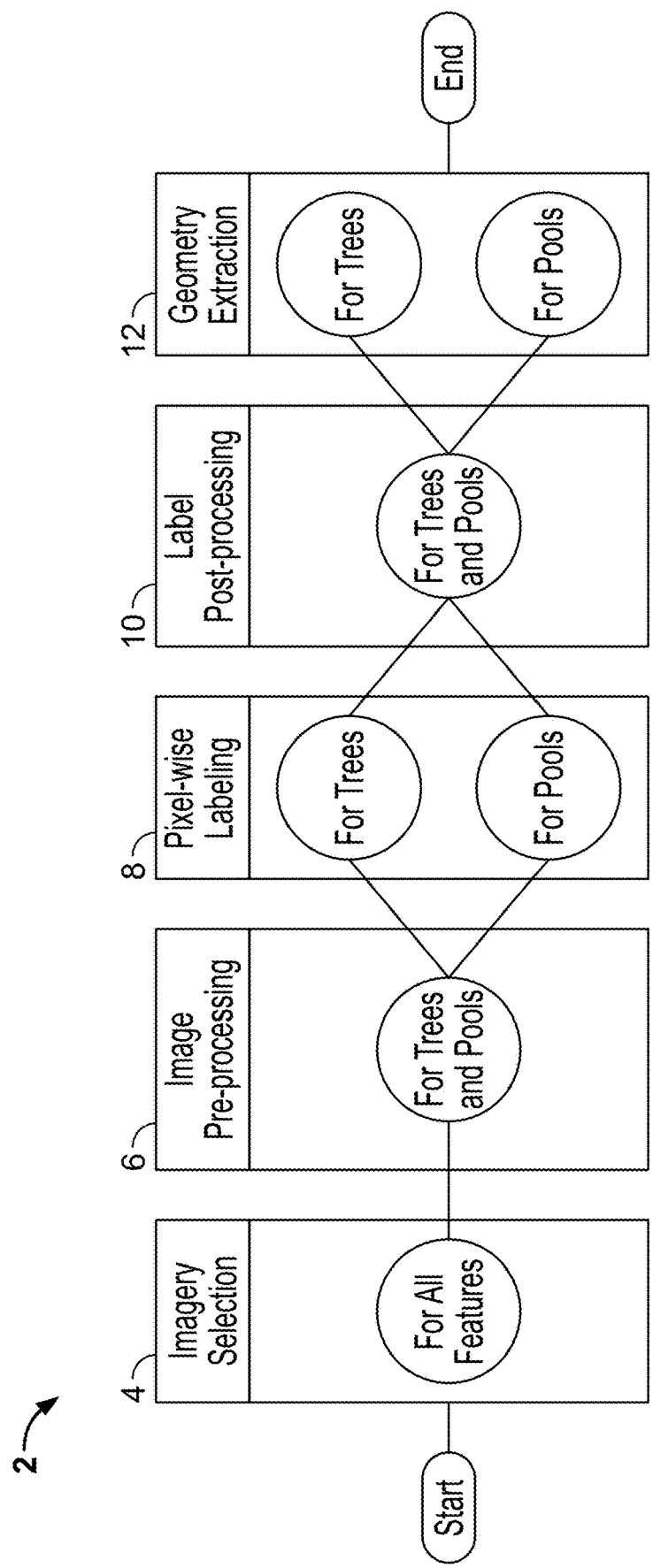
FIG. 1 is a flowchart showing processing steps carried out by the geospatial property feature detection and extraction system of the present disclosure.

FIG. 1 is a flowchart showing processing steps 2 carried out by the geospatial property feature detection and extraction system of the present disclosure. In particular, the process flow can be thought of as a computation graph organized into a pipeline of five steps or phases. FIG. 1 shows the order of the phases: (1) imagery selection step 4, (2) image pre-processing step 6, (3) pixel-wise labeling step 8, (4) label post-processing step 10; and finally, (5) geometry extraction step 12. Each property feature which the system detects can use unique parameters or algorithms in each phase, but for efficiency, the parameters and the algorithms can also be shared. FIG. 1 represents the potential for a variety of configurations with multiple processing nodes in each step or phase. FIG. 1 is only an example configuration, and the present disclosure can include a number of different configurations. The process steps of the invention disclosed herein could be embodied as computer-readable software code executed by one or more computer systems, and could be programmed using any suitable programming languages including, but not limited to, C, C++, C #, Java, Python, or any other suitable languages. Additionally, the computer system(s) on which the present invention could be embodied include, but are not limited to, one or more personal computers, servers, mobile devices, cloud-based computing platforms, etc., each having one or more suitably powerful microprocessors and associated operating system(s) such as Linux, UNIX, Microsoft Windows, MacOS, etc. Still further, the invention could be embodied as a customized hardware component such as a field-programmable gate array (FPGA), application-specific integrated circuit (ASIC), embedded system, or other customized hardware component without departing from the spirit or scope of the present disclosure.

Figure 2:
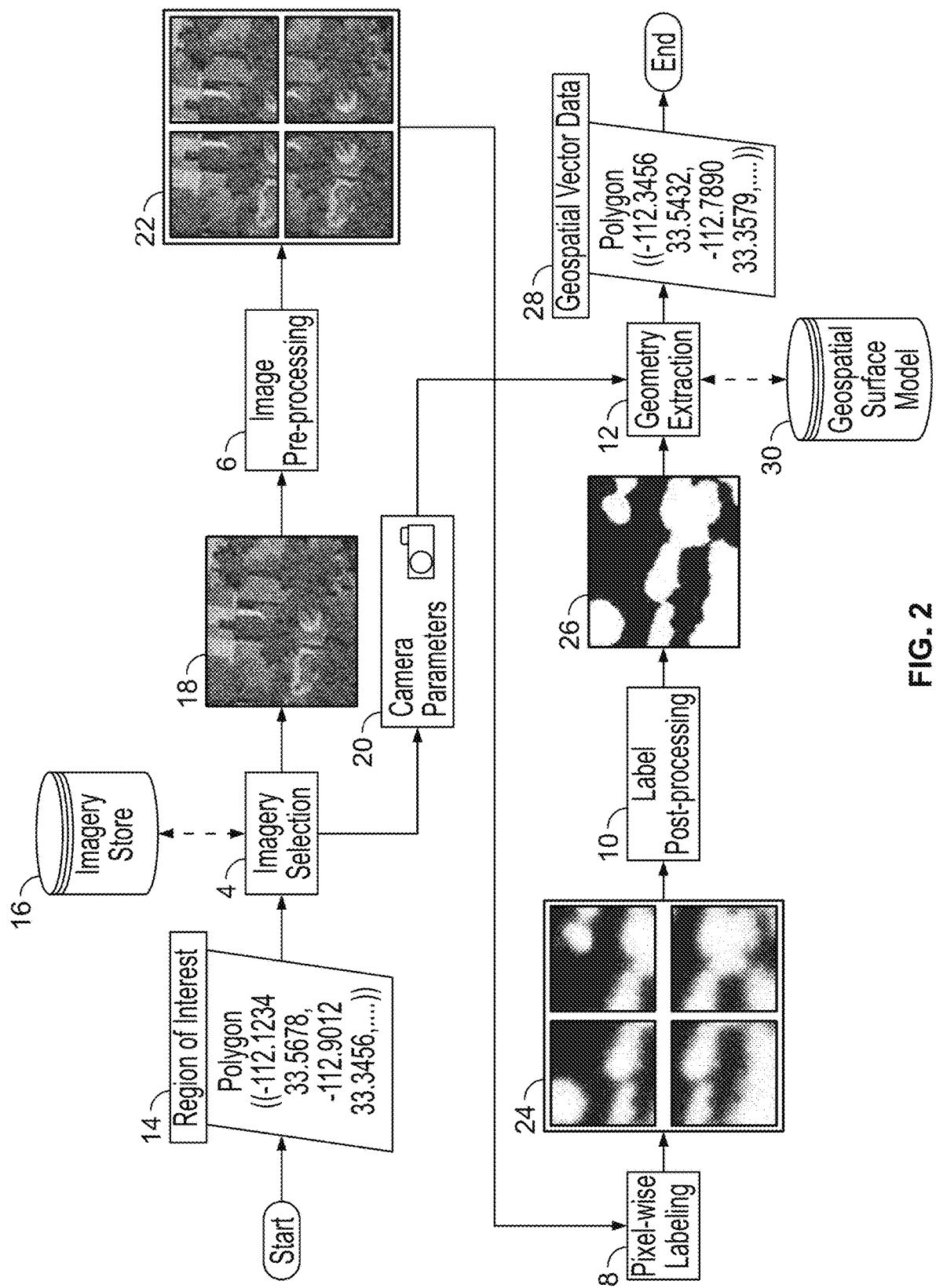
FIG. 2 is a diagram showing an example of how imagery is processed by the process steps of FIG. 1.

The specific functions carried out by each of the steps or phases 4-12 will now be described in greater detail. FIG. 2 is a diagram illustrating how imagery is processed by steps 4-12 of FIG. 1. The system and method of the present disclosure can begin by receiving or determining a geospatial region of interest 14 specified using latitude and longitude coordinates, or any other suitable types of coordinates. The geospatial region of interest 14 can be represented as a polygon in latitude and longitude coordinates, and can be specified by the user using any desired input means, such as by way of a graphical user interface (GUI) where by the user can "draw" the region of interest, a dialogue box wherein the user specifies the desired coordinates, or by any other means. The bounds can be derived in a variety of ways, including, but not limited to: (1) as a rectangle or other shape centered on a postal address in a digital image; (2) from survey data of property parcel boundaries; or (3) from a human user's selection in a digital geospatial mapping interface. FIG. 2 illustrates the region of interest 14 as a snippet of well-known text (WKT) data. Other methods of identifying a region of interest can be used with the present disclosure such as using a graphical user interface or other known means.

In the imagery selection phase 4, the system can receive the region of interest 14 and retrieve imagery from an imagery database 16. The imagery selection step 4 can receive a geospatial region of interest and can select and retrieve one or more images 18 and their associated metadata 20 from the imagery database 16. The metadata 20 can include, but is not limited to, camera parameters as will be explained in greater detail below. In order for images to be used to detect geospatial property features, information about the cameras that captured the images can be used as inputs in the system of the present disclosure. In particular, the intrinsic and extrinsic parameters of the camera used to capture each image can be used as inputs. Intrinsic parameters can include the internal structure and working of the camera, such as its focal length and internal translation. Extrinsic parameters can include the location and orientation of the camera at the time of a capture. Hence, intrinsic parameters are shared among images captured with the same camera, whereas extrinsic parameters are unique to each image.

Still with reference to FIG. 2, the image pre-processing phase 6 takes an image 18 and can prepare one or more uniformly-shaped image tiles 22. Images and image tiles can be thought of as tensors. An image can be a tensor that has a shape h×w×c, where h and w are the spatial height and width of the image and c is the channel dimension of each pixel. For example, color images can include red, blue, and green component color channels. The height, width, and number of channels can vary from image to image. Image tiles can be tensors derived from an image and which can have a uniform height, width, and number of channels, $h_{tile}$, $w_{tile}$, c, to satisfy the requirements of the pixel-wise labeling phase. Image tiles may or may not be able to be directly visualized as an image since the values may be modified—e.g., be less than 0—and the packing order of the tensor may put the channels first instead of last—i.e., ($c×h_{tile}×w_{tile}$) instead of ($h_{tile}×w_{tile}×c$). In FIG. 2, the sub-images corresponding to the image tile tensor are visualized.

Next, the pixel-wise labeling phase 8 processes the image tiles 22 and can produce label tiles 24 corresponding to the image tiles 22. The label tiles and the per-pixel labeling for an image can also be tensors. The label tiles can be tensors with a shape of ($h_{tile}×w_{tile}×c'$), where the height and width match the spatial dimensions of the image tile and c' is the number of channels, one per property feature to be detected. A separate, independent channel per property feature can allow each pixel in the image tile to be labeled as belonging to more than one property feature. Similar to label tiles, label tensors for a whole image can have a shape (h×w×c') where the spatial height and width dimensions match the dimensions of the image and c' is the number of channels, one per property feature to be detected. The system of the present disclosure can work with two kinds of label tensors, e.g., score label tensors and Boolean label tensors, but of course, other kinds of label tensors could be used. In such tensors, channel values can indicate how much a pixel is or is not a part of an instance of the property feature corresponding to the channel. Score label tensors can score each pixel as being a part of the property feature, typically as a probability. The pixel-wise labeling phase 8 can produce score label tensors. In FIG. 2, for example, score label tensors for a single property feature can be visualized by mapping probability 0.0 to black, 1.0 to white, and values in between to gray values. Boolean label tensors can encode a decision per pixel of whether the pixel is part of the property feature or not, e.g., "part-of" can be set to true, and "not-part-of" can be set to false.

Still with reference to FIG. 2, the label post-processing phase 10 can then combine the label tiles 24 into a single labeling (e.g., a label tensor) 26 for the whole image. The image post-processing phase 10 can derive Boolean label tensors from score label tensors, if desirable (since many geometry extraction algorithms work with Boolean label tensors). As can be seen in FIG. 2, for example, Boolean label tensors for a single property feature can be visualized by mapping pixels which are "not-part-of" the property feature to black and pixels which are "part-of" the property feature to white. Using Boolean label tensors can provide certain advantages. For example, Boolean label tensors can use a small amount of memory and can quickly and rapidly be manipulated. Additionally, Boolean labels can simplify geometry extraction since different degrees of pixels being "almost-part-of" or "almost-not-part-of" the property feature do not have to be considered and handled.

The geometry extraction phase 12 can process the image labels 26 from label post-processing phase and can extract relevant geospatial vector data 28 which can identify the property features in pixel-space. Further, the geometry extraction step 12 can use image metadata 20 (e.g., such as camera parameters and geolocation) and can use a known geospatial surface model 30 to map and export the extracted pixel-space vector data as geospatial vector data. Property feature geometry can be first extracted and processed in pixel-space. The property feature geometry can be represented as vector data, but depending on the feature and the intended use the extracted data, property feature geometry can be represented as a polygon outline of the feature, a bounding region around the feature, individual line segments which make up the feature, or any other suitable geometric object. The extracted pixel-space geometry can later be projected to geospatial coordinates using the camera parameters from image metadata 20 and the known elevation of the ground (or other surface) within the region of interest. To project pixel-space vector data to world coordinates, the geometry extraction phase can use the elevation of a surface, such as the ground, within the region of interest. Digital terrain models (DTMs) and digital elevation models (DEMs) can provide such elevation information for a location specified by latitude and longitude.

The imagery selection phase 4 of FIGS. 1-2 will now be explained in greater detail. The imagery selection phase 4 can receive a geospatial region of interest (ROI) 14 and can select and retrieve one or more images 18, including their metadata 20, from an imagery data store. Multiple images 18 may overlap all or a portion of the ROI 14. Multiple images or a single image can be selected for processing, depending on the size of the ROI 14 and whether the later phases detect property features from independent images or multiple images at a time. Detecting property features from single independent images can be done on nadir image captures, where the camera is above the objects of interest and pointed straight down towards the ground. Oblique imagery can also be used, for example, for determining the elevation of property features. Regardless of whether one image or multiple images are used, the system can use image(s) which cover the ROI 14 and in which the ROI 14 is as close to the center of the image as possible, since camera distortion is more pronounced along the image edges than in the center. However, the present disclosure is not limited to using images which cover the ROI 14 and in which the ROI 14 is as close to the center of the image as possible. Once selected, the images can be cropped around the ROI 14 plus some additional padding or margin to provide context.

Figure 3:
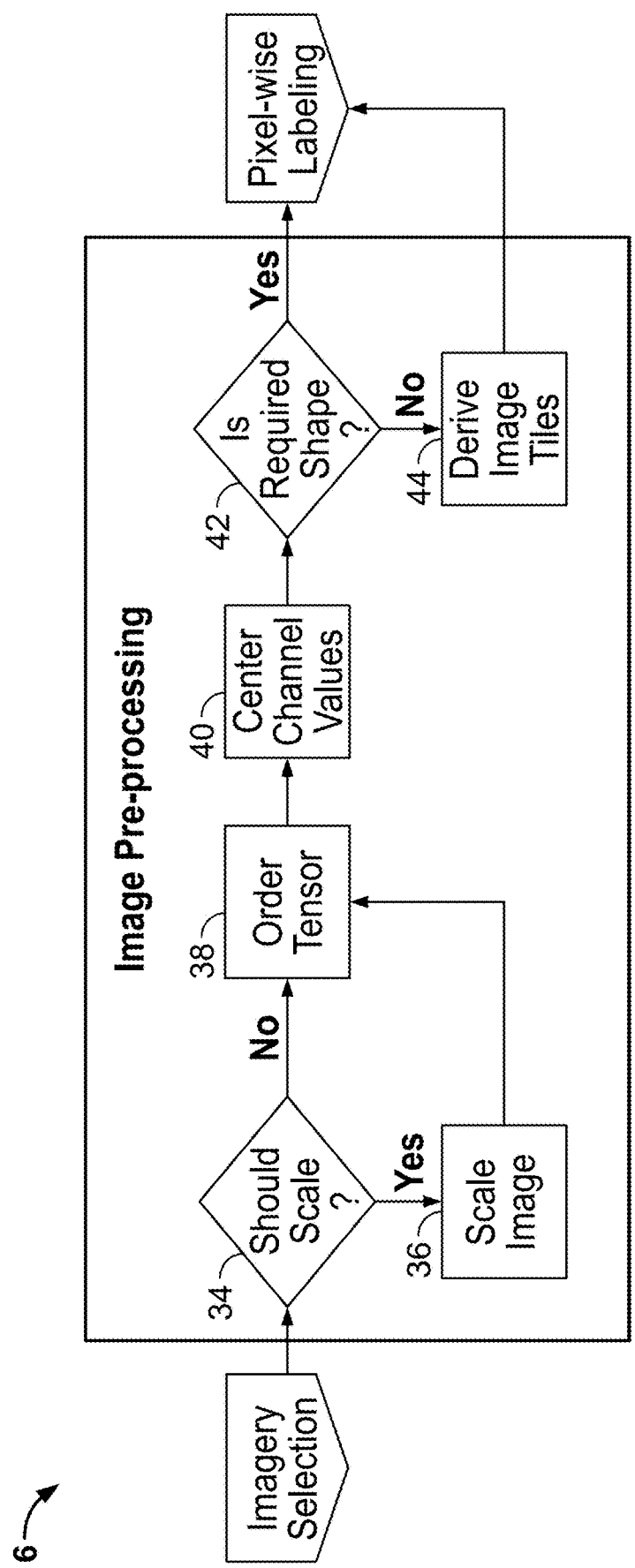
FIG. 3 is a flowchart illustrating the image pre-processing step of FIG. 1 in greater detail.

FIG. 3 is a flowchart illustrating the image pre-processing phase 6 of FIGS. 1-2 in greater detail. As noted above, the image pre-processing phase 6 can transform each selected image 18 into image tiles 22. Each image tile 22 can be formatted to satisfy the requirements of pixel-wise labeling models. Indeed, the system can use similar image pre-processing techniques as the techniques for training the pixel-wise labeling models. The operations required to transform the selected images to image tiles can be different for each pixel-wise labeling model. FIG. 3 shows a possible configuration of some image pre-processing operations suitable for preparing image tiles for use with convolutional neural network (CNN) models. The high-level operations could be reordered and still suitably transform the selected images to image tiles, although the low-level data manipulations could be different.

In step 34, the system makes a determination as to whether to scale an image. If the result is positive, the process proceeds to step 36 where the image is scaled. Scaling an image can, in some instances, provide greater efficiencies and better image quality during later phases, such as the pixel-wise labeling phase 8. Moreover, shrinking the image can lead to shorter processing times, since there are less pixels to process. Pixel-wise labeling models can be trained on annotated images at different scales so that shrinking the image will not drastically reduce the labeling quality. Further, shrinking the image can allow the model to take into account wider, yet high-level, visual context around each pixel. Scaling can be performed with an image rescale operation which interpolates between discrete pixel values, such as bilinear or bicubic interpolation. The system can scale down by up to 80%, however, other scaling parameters can be used in the system of the present disclosure. Scaling the image to multiple different sizes can be used to detect very large property features. Scaling the image can be thought of as zooming in or out. By zooming out more (e.g., scaling down more), the pixel-wise labeling model can take into account a wider context around each original pixel. Zooming out can be used to determine entire property features which cover a wide area, such as the contour of large commercial structures. By zooming in more (e.g., scaling down less), or even scaling up—the pixel-wise labeling model can take into account the local context around each original pixel. Zooming in can also be helpful to better detect the shape of a property feature, such as corners in building structure contours or arcs in pool contours.

After step 36, or if the result of 34 is negative, the process proceeds to step 38, wherein the system orders image tensors. The channel order of the image tensor can be organized to match the tensor format required by the pixel-wise labeling model. Image tensors cam include red, green, and blue component color channels (a.k.a. RGB) and can also include depth or near infrared channels. Image processing software libraries can organize the image channels differently when images are loaded into memory. For example, one library can order the color channels in RGB order and another in BGR order. Different image processing libraries can be used to train the pixel-wise labeling models and to then use the models. In that case, the image tensor's channels can be re-ordered once loaded to match the channel order required by the pixel-wise labeling model. The packing order of the image tensor can also match the pixel-wise labeling model tensor requirements. When loaded, image tensors can have an (h×w×c) packing order. In some cases, the system can run more efficiently when the pixel-wise labeling model works with tensors where the channels and spatial dimensions are transposed to (c×h×w). Although the transformed image tensor may no longer be directly visualized as an image, it can be called an image tensor since it is derived from the input image.

Figure 4:
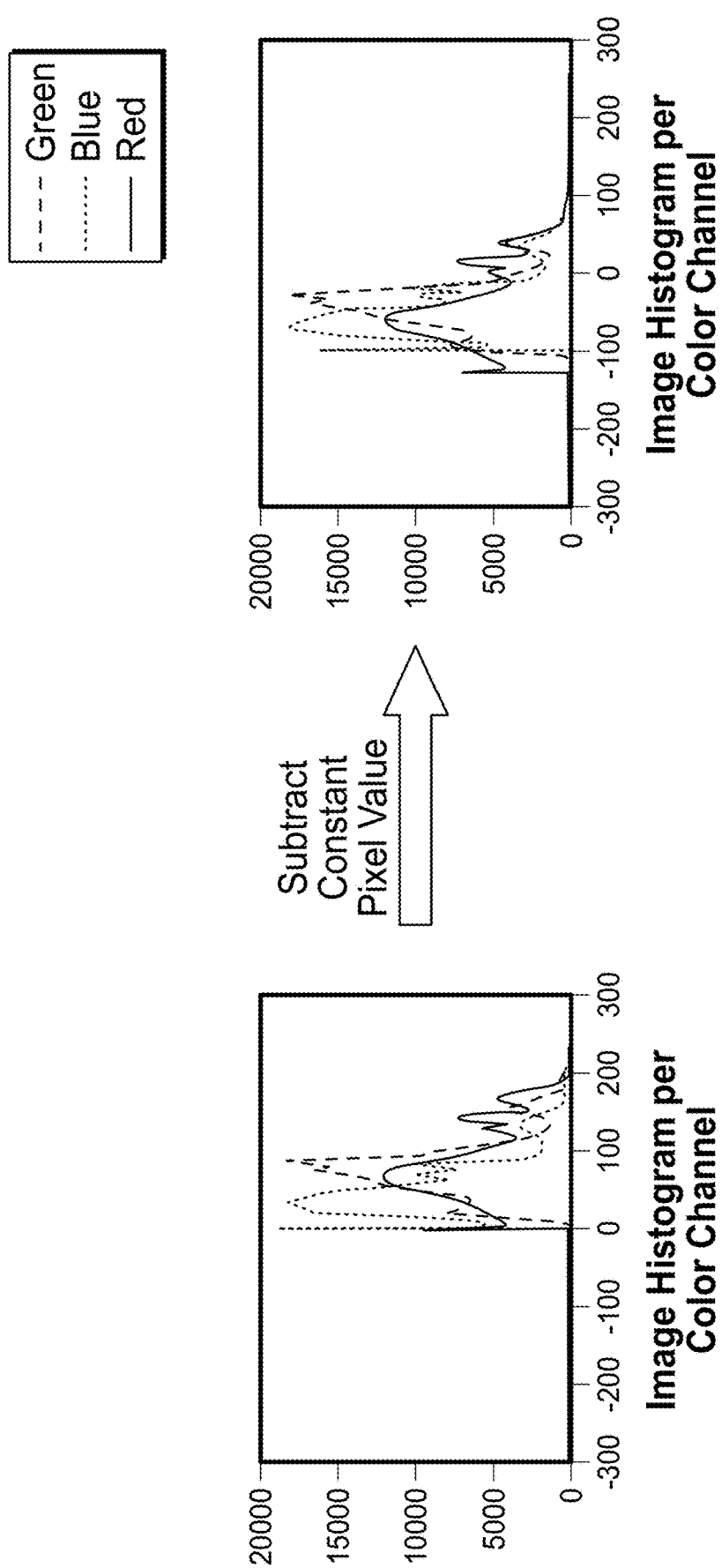
FIG. 4 depicts a pair of graphs illustrating how an image's red, green, and blue (RGB) color channels can be shifted by subtracting the general RGB mean values.

After step 38, step 40 occurs, wherein the system centers channel values. The image tensor's values can be modified by subtracting a constant value from each channel. The per-channel constant values to subtract can be determined beforehand by calculating the arithmetic mean for the channel over a large set of aerial images which are representative of the images to be processed. Subtracting the general mean value effectively centers channel values on zero when applied over many images, but not necessarily for each individual image. FIG. 4 illustrates how an image's red, green, and blue (RGB) channels can be shifted by subtracting the general RGB mean values. Centering values around zero has a number of benefits for training and using convolutional neural networks for pixel-wise labeling. For example, centering values around zero is mathematically simple because it allows the neural network to generalize better to a variety of imagery sources. Also, it is more numerically stable since more floating point bits can be used for precision. Since the channel values can be centered when the neural network is trained, they can also be centered when the neural network is applied. As noted above, although the transformed image tensor may no longer be directly visualized as an image, it can be called an image tensor since it is derived from the input image.

Deriving image tiles in connection with FIG. 3 will now be explained in greater detail. After step 40, the process 32 can proceed to step 42 where a determination is made as to whether the system requires a shape. If a negative determination is made, the process 32 can proceed to step 44 where image tiles are derived. The image tensor can be expanded or sub-divided so that uniformly-shaped image tiles can be passed on to the pixel-labeling phase 8. The system can use uniformly-shaped input to enhance the next phase where convolutional neural networks are used for pixel-wise labeling. Doing so can save time and resources that would be needed to reconfigure the network for different shapes. Furthermore, doing so can ensure that the neural network can fit and run in memory. Accordingly, the system can expand smaller-than-required image tensors and sub-divide smaller-than-required image tensors into image tiles with a uniform shape. Images can be expanded or sub-divided such that each original pixel can be contained in one or more of the image tiles. Image expansion can be done by padding the original image with default "padding pixels"—for example, zeros in every channel—to all sides of the image. Other expansion methods, such as interpolation, could be used. If the system uses interpolation, the system can ensure that labels in label post-processing can be mapped back to the original pixels.

Figure 5:
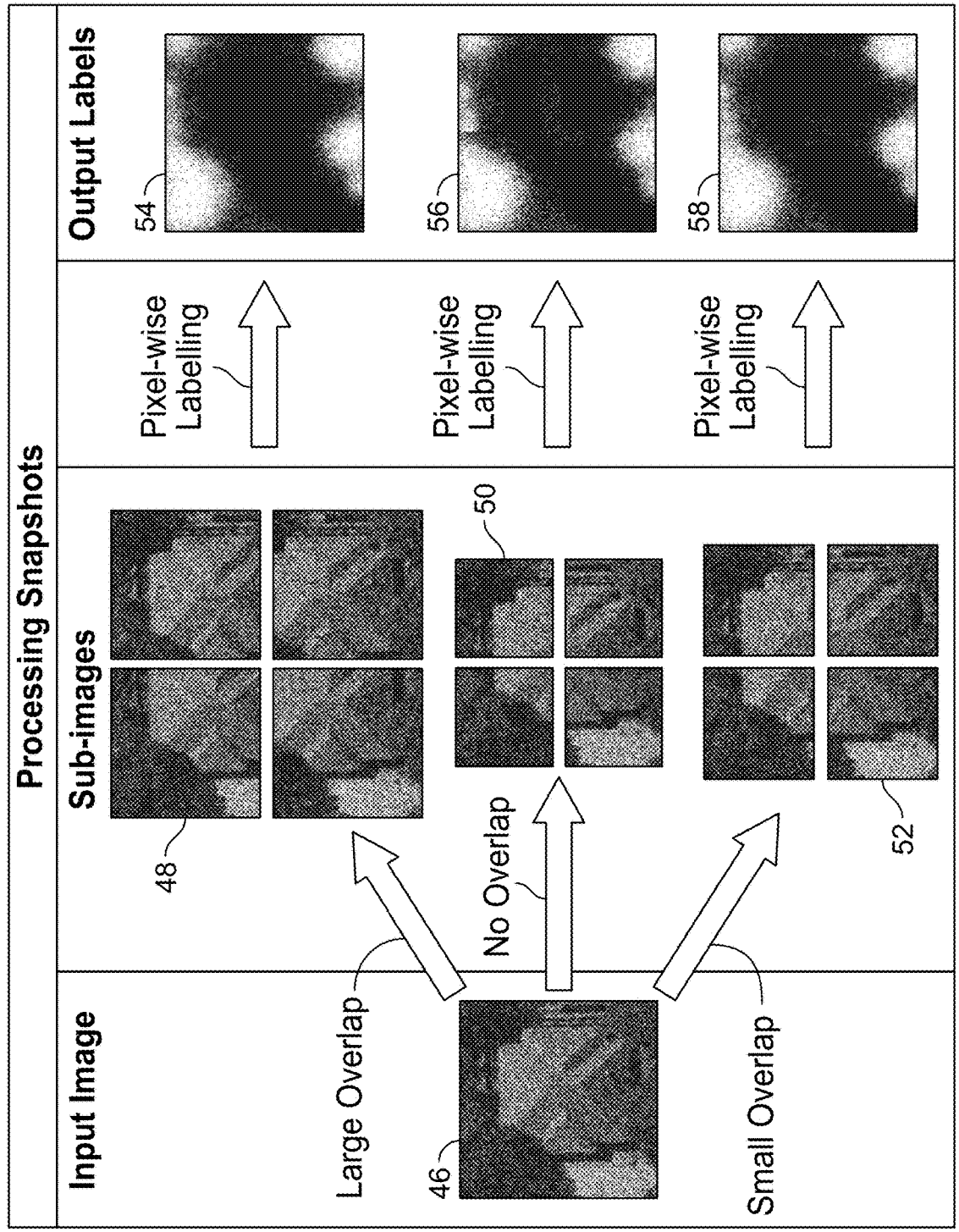
FIG. 5 illustrates image subdivision performed by the system by sliding a cropping window over the original image.

FIG. 5 is a drawing illustrating image subdivision performed by the system by sliding a cropping window over the original image. It should be noted that image sub-division can be done in a variety of other ways, such as by using a visual attention mechanism to identify regions of the image where a particular property feature is more likely and then taking center crops around those regions of interest plus other crops needed to cover the whole image. FIG. 5 shows how an image might be sub-divided by sliding a cropping window from the top-left of the original image and using large overlaps 48, no overlaps 50, and small overlaps 52. The output labels can be derived from the pixel-wise labeling phase 8 and the post-processing phase 10 to stitch the label tiles together into one label tensor. Using large overlaps produces an output label 54 by processing some pixels multiple times. Using no overlap produces an output label 56 which can require padding odd-shaped windows. Using a small overlap can produce an output label 58. The pixels shared among sub-image tiles can be along the edge of a tile while also more in the center of another tile. Accordingly, when stitching label tiles in post-processing phase 10, the system can ignore the labels along tile edges and keep the labels in tile centers. Ideally, when the whole image is scaled in scale image step 36 of the process, it can be scaled to a size that will reduce the number of sub-image tiles that will be derived without drastically reducing labeling quality. As noted above, scaling down by up to 80% is preferable but not required by the present disclosure. The present disclosure can use any of the overlap methods, although the small overlap 52 is preferable and can reduce processing time in certain instances.

Figure 6:
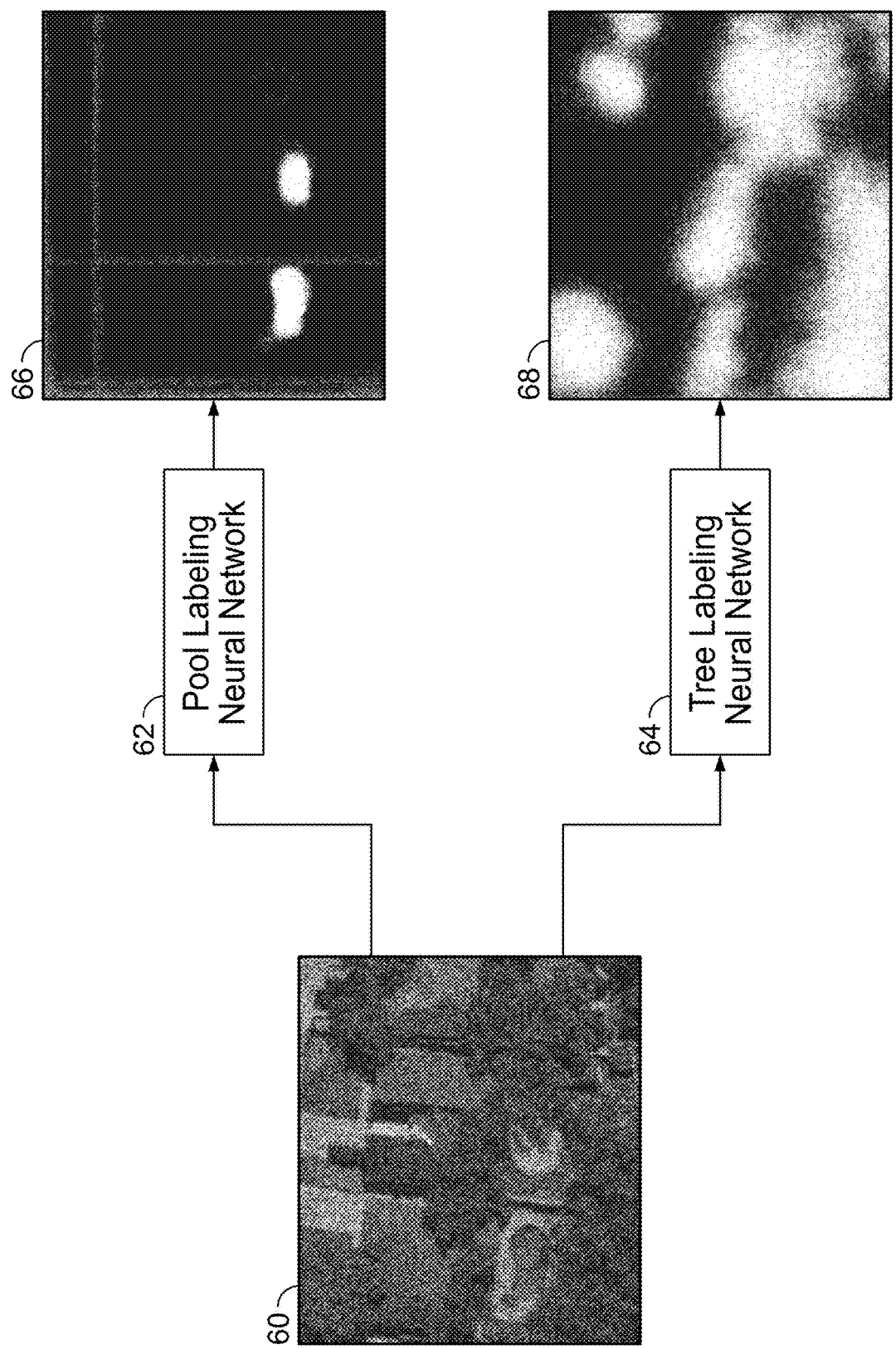
FIG. 6 illustrates an example output of pixel-wise labelling performed by the system.

FIG. 6 illustrates pixel-wise labelling phase 8 in greater detail. The pixel-wise labeling phase 8 can produce labels for each pixel in an image tile, thus producing a label tile. Moreover, the pixel-wise labeling phase 8 can be done with any suitable computer vision model or algorithm which can predict a label for each pixel in the input image. Fully convolutional networks (FCNs) are neural networks which can be used for pixel-wise labeling since they can produce state-of-the-art results and automatically discover which image features are important or unimportant to a given task (provided enough annotated data and time to train). FCNs can be composed of multiple layers of operations that include, but are not limited to, convolution, pooling, non-linear activation functions, "deconvolution," and unpooling. One or more of the layers of the network can output a score label tensor, such as probability scores, which indicate how much each pixel belongs to each property feature. The pixel-wise labeling phase 8 can include one or more models, and each model can label one or more property features at a time. FIG. 6 shows an example of pixel-wise labeling for pool and tree detection. The input image 60 can be processed by two independent FCNs, a pool labelling neural network 62 and a tree labelling neural network 64. The pool labelling neural network 62 and the tree labelling neural network 64 can produce score label tensors. The score label tensors can be visualized by mapping probability values on [0.0, 1.0] to gray-scale pixel values on [0, 255]. The pool labelling neural network 62 can produce an output 66 and the tree labelling neural network 64 can produce an output 68. The system of the present disclose can also use one FCN to be trained to produce two label score tensors, one for pools and the other for trees.

Figure 7:
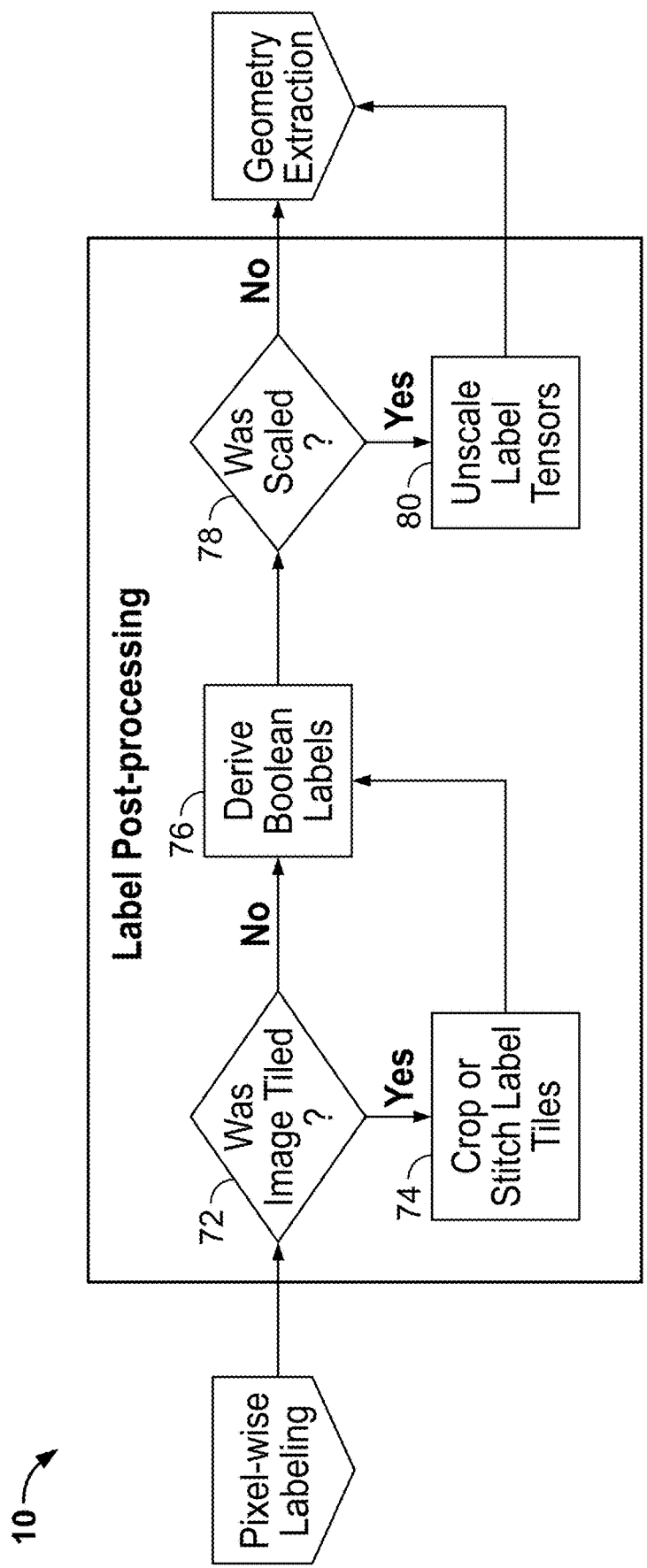
FIG. 7 is a flowchart illustrating the label post-processing step of FIG. 1 in greater detail.

FIG. 7 is a flowchart illustrating the label post-processing phase 10 of FIGS. 1-2 in greater detail. Label post-processing can transform the scores produced by the pixel-wise labeling networks for one or more image tiles into one label tensor for the original input image. Label post-processing can include three high-level operations: (1) crop or stitch label tensors, (2) derive Boolean label tensors, and (3) unscale label tensors. FIG. 7 shows a possible operation order, however, the present disclosure is not limited by this order and any order of the processing steps 70 can be carried out.

The process 10 can begin with step 72 in which a determination is made as to whether the image was tiled as discussed above. If a positive determination is made, the process can proceed to step 74 in which the label tiles can be cropped or stitched. The label tiles output by pixel-wise labeling can be cropped or stitched together to produce a single label tensor for the possibly scaled input image. Cropping a label tile so as to ignore padding pixels is the inverse operation to expanding an image during the image pre-processing phase 6 as discussed in detail above. Stitching multiple label tiles together is the inverse operation to sub-dividing an image during the image pre-processing phase 6 as discussed in greater detail above. There are various stitching algorithms which operate pixel-by-pixel, including, for example: (1) average all of the scores for the pixel from the various label tiles, or (2) use the score from the label tile in which the pixel is most in the center of the tile, or (3) as a combination of 1 and 2: average the scores for the pixel from label tiles where the pixel is not close to the edge of the tile.

Figure 8:
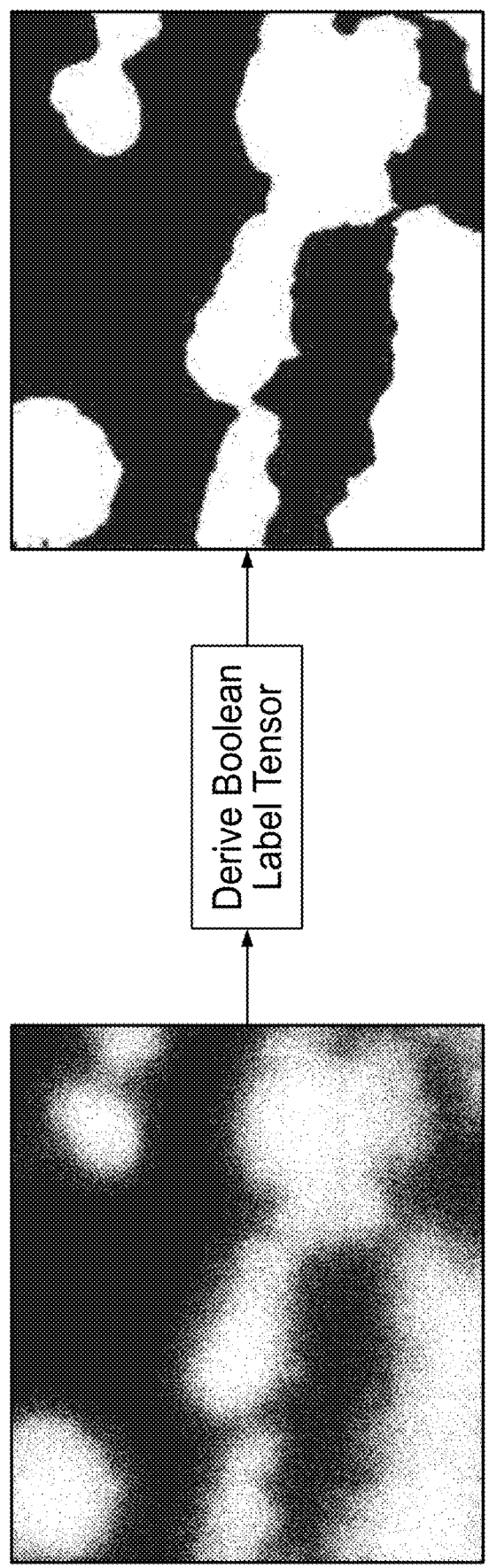
FIG. 8 illustrates a sample output from the label post processing phase.

After step 74, or if a negative determination was made in step 72, the process can proceed to step 76 in which Boolean labels can be derived. The score label tiles can be converted to Boolean label tensors using a threshold operation. For each property feature, the pixel can be labeled as being "part-of" a property feature instance if the pixel's score is above a threshold value and otherwise can be labeled as "not-part-of" the property feature if the score is below the threshold. FIG. 8 illustrates how tree probabilities can be converted to tree labels using an example threshold of 0.5 (or equivalently, an argmax operation). Probabilities can be visualized by mapping 0.0 to black, 1.0 to white, and values in between to levels of gray. The brighter a pixel is the more likely it is to be a part of a property feature instance. Pixels that have "not-part-of" labels can be visualized as black and pixels that have "part-of" labels can be visualized as white. As can be seen in FIG. 8, a visualization of probabilities can be a noisy representation of property features but the output of the Boolean label tensor can be crisp and distinct.

With reference back to FIG. 7, after step 76, the process can proceed to step 78 where a determination can be made as to whether the image was scaled. If a positive determination is made, the process can proceed to step 80 where label tensors can be unscaled. The label tensor can be unscaled to assign a label to each pixel in the whole input image if it had been scaled during the image pre-processing phase 6. To unscale the label tensor, the system can scale the image in reverse from when it was scaled during image scaling. In particular, if the image was shrunk in the prior steps then the labels can be expanded, and if the image was expanded in the prior steps, then the labels can be shrunk. Unscaling a score label tensor can be done by interpolating the score values, similar to how the image was scaled by interpolating pixel values, or can be done with a nearest neighbor approach. Unscaling a Boolean label tensor can be done using a nearest neighbor approach, instead of interpolation, so that the labels remain as binary "part-of" of the feature and "not-part-of" feature values. If the image is processed at multiple scales, then the label tensors can be combined into a single label tensor. The combination can be done in a variety of ways, including: applying a bit-wise OR operation to Boolean label tensors, or doing a weighted combination of score label tensors, such as with a linear combination or with a soft-max function.

The geometry extraction phase 12 of FIGS. 1-2 can extract and export 2D geospatial representations of property feature regions from the label tensor for the input image. The system can extract vector data which represents the property feature in pixel space. The pixel-space property feature vector data can be projected to world coordinates using the image metadata and the elevation of a surface in the region of interest, such as the ground elevation from a digital terrain model. Property feature representations in pixel-space can be extracted using an appropriate contour extraction, bounding box finding, or other similar algorithm. Prior to extracting vector data, the noise, or small holes, for each property feature in the label tensor can be filled-in or closed using morphological image transformations.

Figure 9:
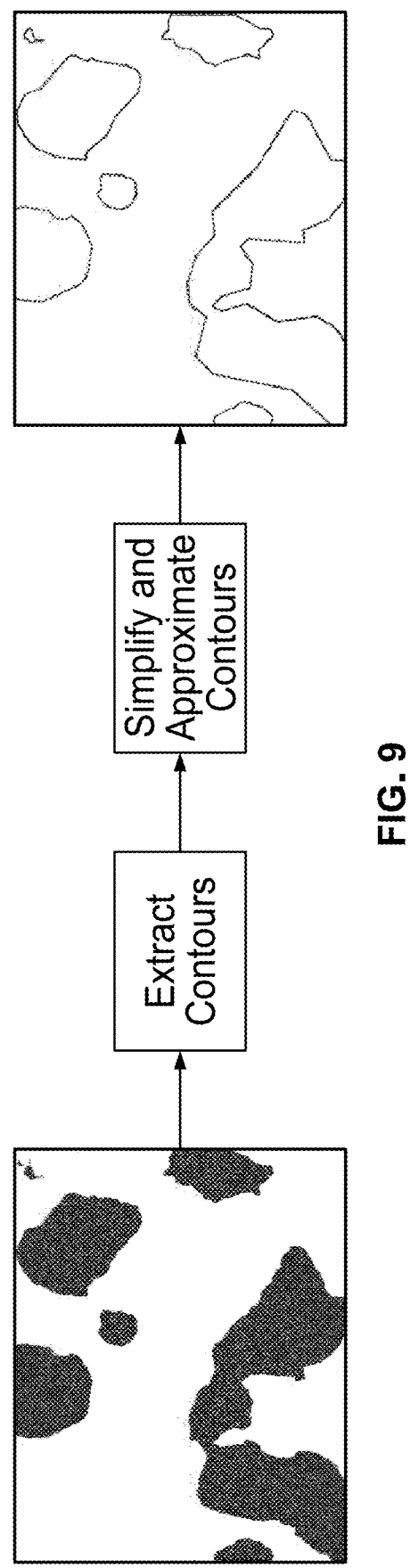
FIG. 9 illustrates an example feature contour extraction generated by the system.

FIG. 9 is a drawing illustrating an example output of contour extraction performed by the system. To extract contour outlines of the property feature, a contour extraction algorithm can be used which uses the Boolean labels such as whether the pixel is "part-of" and "not-part-of" the property feature to find the region bounds for each property feature type. Some examples of contour tracing algorithms include, but are not limited to: (1) Square Tracing, (2) Moore-Neighbor, (3) Radial Sweep and (4) Theo Pavlidis' Algorithm. The outputs of the contour extraction algorithm can be closed polygons in pixel space. The extracted polygons can be further simplified, or smoothed, in their representation by using a fewer number of points to represent each one. Alternatively, a bounding box can be extracted by taking the bounds around extracted contours. FIG. 9 shows an example of contour extraction and simplification for trees. Tree contours can be extracted from the Boolean label tensor, and then are further simplified by reducing the number of line segments used to represent the polygon. For some property features it may be desirable to approximate the extracted representation with a simpler or standard parametric shape. For example, pools can be approximated with a rectangle or an ellipse. Small trees can be represented by ellipse approximations. The different processing nodes for geometry extraction can be configured to use different approximations for the extracted contours. A simpler shape can be obtained by calculating the convex hull of the polygon instead of the actual polygon, although using the convex hull can increase the area of concave polygons. If sufficiently rectangular, the convex hull can be simplified to a rectangle.

The extracted pixel-space vector data can be projected to world geospatial coordinates using image metadata and a known surface elevation. Known surface elevations, such as the elevation of the ground above sea level, can be obtained from digital terrain models (DTMs) or digital elevation models (DEMs). The particular elevation to use can be retrieved by calculating the center of the region of interest provided as input to the system, and then querying the DTM for the elevation of the ground at that latitude and longitude. The intrinsic camera parameters can be used to transform pixel-space coordinates to camera coordinates which adjust for geometric distortion introduced by the camera optics. The camera-space coordinates can be transformed to world coordinates using the camera extrinsic parameters, which identify the geolocation of the camera, and the known surface elevation. For each point in camera-space, a ray can be projected from the point, parallel to the camera's optical axis, until it intersects with the known surface. The intersection point can be the geospatial location for the original pixel-space point. The transformation can be applied to each pixel-space coordinate of the property feature vector data to produce a geospatial vector data representation for the property feature. Once the vector data is converted to geospatial coordinates, all of the extracted data can be exported out of the system. The system can export by returning the geospatial vector data to the user to use as they see fit, or it could be that the vector data is persisted to a geospatial data store such the data can later be retrieved and utilized.

In another embodiment, the system of the present disclosure can detect non-geometric property features from aerial imagery. These non-geometric property classification features can include, but are not limited to, roof materials, roof condition, roof age, and wall materials. As will be explained in greater detail below, these classification features can be used to annotate existing structural geometries that have been detected and extracted from images using the processes discussed above in connection with FIGS. 1-9, or to annotate pre-existing structural models created by other systems/methods.

Figure 10:
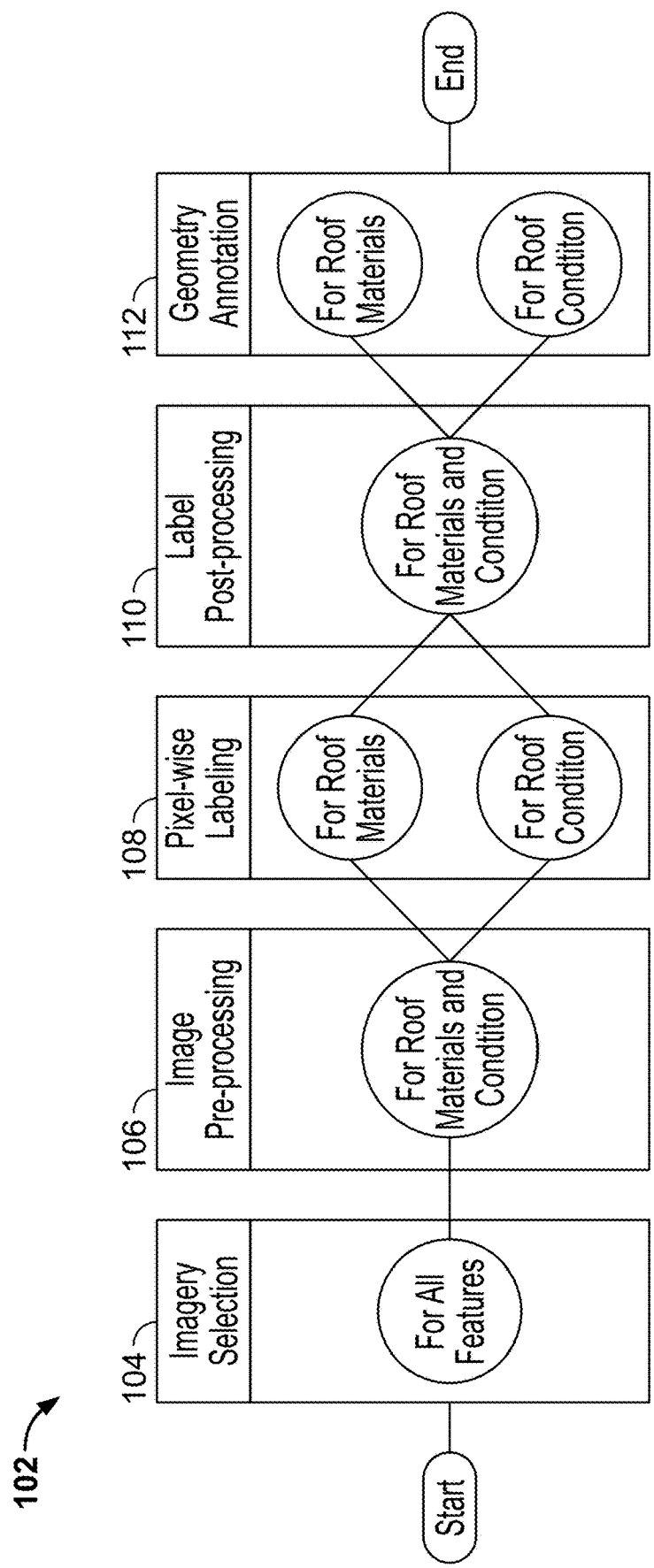
FIG. 10 is a flowchart showing processing steps carried out by another embodiment of the system, wherein non-geometric geospatial property features can be detected and extracted from images.

FIG. 10 is a flowchart showing processing steps 102 carried out by the non-geometric geospatial property feature detection and extraction system of the present disclosure. In particular, the process flow can be thought of as a computation graph organized into a pipeline of five steps or phases. FIG. 10 shows the order of the phases: (1) imagery selection step 104, (2) image pre-processing step 106, (3) pixel-wise labeling step 108, (4) label post-processing step 110; and finally, (5) geometry annotation step 112. Each non-geometric property feature which the system detects can use unique parameters or algorithms in each phase, but for efficiency, the parameters and the algorithms can also be shared. FIG. 10 represents the potential for a variety of configurations with multiple processing nodes in each step or phase. FIG. 10 is only an example configuration, and the present disclosure can include a number of different configurations. The process steps of the invention disclosed herein could be embodied as computer-readable software code executed by one or more computer systems, and could be programmed using any suitable programming languages including, but not limited to, C, C++, C #, Java, Python, or any other suitable languages. Additionally, the computer system(s) on which the present invention could be embodied include, but are not limited to, one or more personal computers, servers, mobile devices, cloud-based computing platforms, etc., each having one or more suitably powerful microprocessors and associated operating system(s) such as Linux, UNIX, Microsoft Windows, MacOS, etc. Still further, the invention could be embodied as a customized hardware component such as a field-programmable gate array (FPGA), application-specific integrated circuit (ASIC), embedded system, or other customized hardware component without departing from the spirit or scope of the present disclosure.

Figure 11:
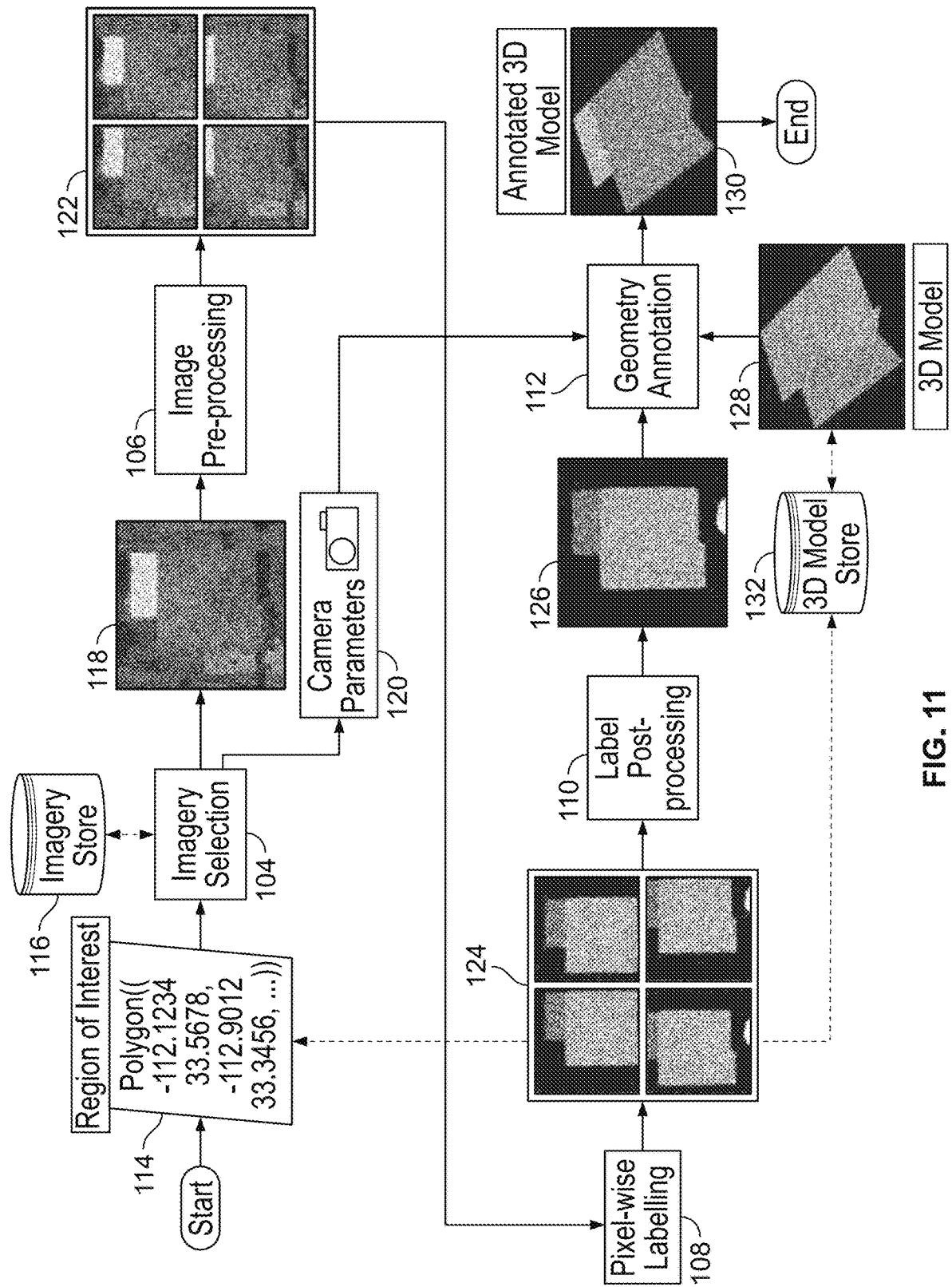
FIG. 11 is a diagram illustrating how imagery is processed by the process steps of FIG. 10.

The specific functions carried out by each of the steps or phases 104-112 will now be described in greater detail. FIG. 11 is a diagram illustrating how imagery is processed by steps 104-112 of FIG. 10. The system and method of the present disclosure can begin by receiving or determining a geospatial region of interest 114 specified using latitude and longitude coordinates, or any other suitable types of coordinates. The geospatial region of interest 114 can be represented as a polygon in latitude and longitude coordinates, and can be specified by the user using any desired input means, such as by way of a graphical user interface (GUI) where by the user can "draw" the region of interest, a dialogue box wherein the user specifies the desired coordinates, or by any other means. The bounds can be derived in a variety of ways, including, but not limited to: (1) as a rectangle or other shape centered on a postal address in a digital image; (2) from survey data of property parcel boundaries; or (3) from a human user's selection in a digital geospatial mapping interface. FIG. 11 illustrates the region of interest 114 as a snippet of well-known text (WKT) data. Other methods of identifying a region of interest can be used with the present disclosure such as using a graphical user interface or other known means.

In the imagery selection phase 104, the system can receive the region of interest 114 and retrieve imagery from an imagery database 116. The imagery selection step 104 can receive a geospatial region of interest 114 and can select and retrieve one or more images 118 and their associated metadata 120 from the imagery database 116. This also includes information regarding geometry annotation. The metadata 120 can include, but is not limited to, camera parameters as will be explained in greater detail below. In order for images to be used to detect non-geometric geospatial property features, information about the cameras that captured the images can be used as inputs in the system of the present disclosure. In particular, the intrinsic and extrinsic parameters of the camera used to capture each image can be used as inputs. Intrinsic parameters can include the internal structure and working of the camera, such as its focal length and internal translation. Extrinsic parameters can include the location and orientation of the camera at the time of a capture. Hence, intrinsic parameters are shared among images captured with the same camera, whereas extrinsic parameters are unique to each image. This data can be used for projecting geospatial coordinates into image space during the annotation phase.

Still with reference to FIG. 11, the image pre-processing phase 106 takes an image 118 and can prepare one or more uniformly-shaped image tiles 122. Images and image tiles can be thought of as tensors. An image can be a tensor that has a shape h×w×c, where h and w are the spatial height and width of the image and c is the channel dimension of each pixel. For example, color images can include red, blue, and green component color channels. The height, width, and number of channels can vary from image to image. Image tiles can be tensors derived from an image and which can have a uniform height, width, and number of channels, $k_{tile}$, $w_{tile}$, c, to satisfy the requirements of the pixel-wise labeling phase. Image tiles may or may not be able to be directly visualized as an image since the values may be modified—e.g., be less than 0—and the packing order of the tensor may put the channels first instead of last—i.e., (c×$h_{tile}$×$w_{tile}$) instead of ($h_{tile}$×$w_{tile}$×c). In FIG. 11, the sub-images corresponding to the image tile tensor can be visualized.

Next, the pixel-wise labeling phase 108 processes the image tiles 122 and can produce label tiles 124 corresponding to the image tiles 122. The label tiles and the per-pixel labeling for an image can also be tensors. The label tiles can be tensors with a shape of ($h_{tile}$×$w_{tile}$×c'), where the height and width match the spatial dimensions of the image tile and c' is the number of channels, one per property feature to be detected. A separate independent channel per property feature can allow each pixel in the image tile to be labeled as belonging to more than one property feature. For example, a roof material type might be a single property feature and the different channels can be shingle, metal, tile, etc. Similar to label tiles, label tensors for a whole image can have a shape (h×w×c') where the spatial height and width dimensions match the dimensions of the image and c' is the number of channels, one per property feature to be detected. The system of the present disclosure can work with two kinds of label tensors, e.g., score label tensors and Boolean label tensors, but of course, other kinds of label tensors could be used. In such tensors, channel values can indicate how much a pixel is or is not a part of an instance of the property feature corresponding to the channel. Score label tensors can score each pixel as being a part of the property feature, typically as a probability. The pixel-wise labeling phase 108 can produce score label tensors. In FIG. 11, for example, score label tensors for a single property feature can be visualized by mapping probability 0.0 to black, 1.0 to white, and values in between to gray values. Boolean label tensors can encode a decision per pixel of whether the pixel is part of the property feature or not, e.g., "part-of" can be set to true, and "not-part-of" can be set to false.

Still with reference to FIG. 11, the label post-processing phase 110 can then combine the label tiles 124 into a single labeling (e.g., a label tensor) 126 for the whole image. The image post-processing phase 110 can derive Boolean label tensors from score label tensors, if desirable (since many geometry extraction algorithms work with Boolean label tensors). As can be seen in FIG. 11, for example, Boolean label tensors for a single property feature can be visualized by mapping "not-part-of" to black and "part-of" to various shades of gray depending on the class that the pixel is "part-of". Using Boolean label tensors can provide certain advantages. For example, Boolean label tensors can use a small amount of memory and can quickly and rapidly be manipulated. Additionally, Boolean labels can simplify geometry extraction since different degrees of pixels being "almost-part-of" or "almost-not-part-of" the property feature do not have to be considered and handled.

The geometry annotation phase 112 can process the image labels 126 from label post-processing phase 110, one or more three dimensional models 128 found in the region of interest 114, and image metadata 120 to annotate portions of the one or more three dimensional models 128 to generate an annotated three dimensional model 130 for each of the one or more three dimensional models 128. The one or more three-dimensional models 128 can be retrieved from an image store database 132 or the three-dimensional models can be generated by the system of the present disclosure.

The imagery selection phase 104 of FIGS. 10-11 will now be explained in greater detail. The imagery selection phase 104 can receive a geospatial region of interest (ROI) 114 and can select and retrieve one or more images 118, including their metadata 120, from an imagery data store. Multiple images 118 may overlap all or a portion of the ROI 114. Multiple images or a single image can be selected for processing, depending on the size of the ROI 114 and whether the later phases detect property features from independent images or multiple images at a time. Detecting property features from single independent images can be done on nadir image captures, where the camera is above the objects of interest and pointed straight down towards the ground. Oblique imagery can also be used, for example, for determining the elevation of property features. Regardless of whether one image or multiple images are used, the system can use image(s) which cover the ROI 114 and in which the ROI 114 is as close to the center of the image as possible, since camera distortion is more pronounced along the image edges than in the center. However, the present disclosure is not limited to using images which cover the ROI 114 and in which the ROI 114 is as close to the center of the image as possible. Once selected, the images can be cropped around the ROI 114 plus some additional padding or margin to provide context.

Figure 12:
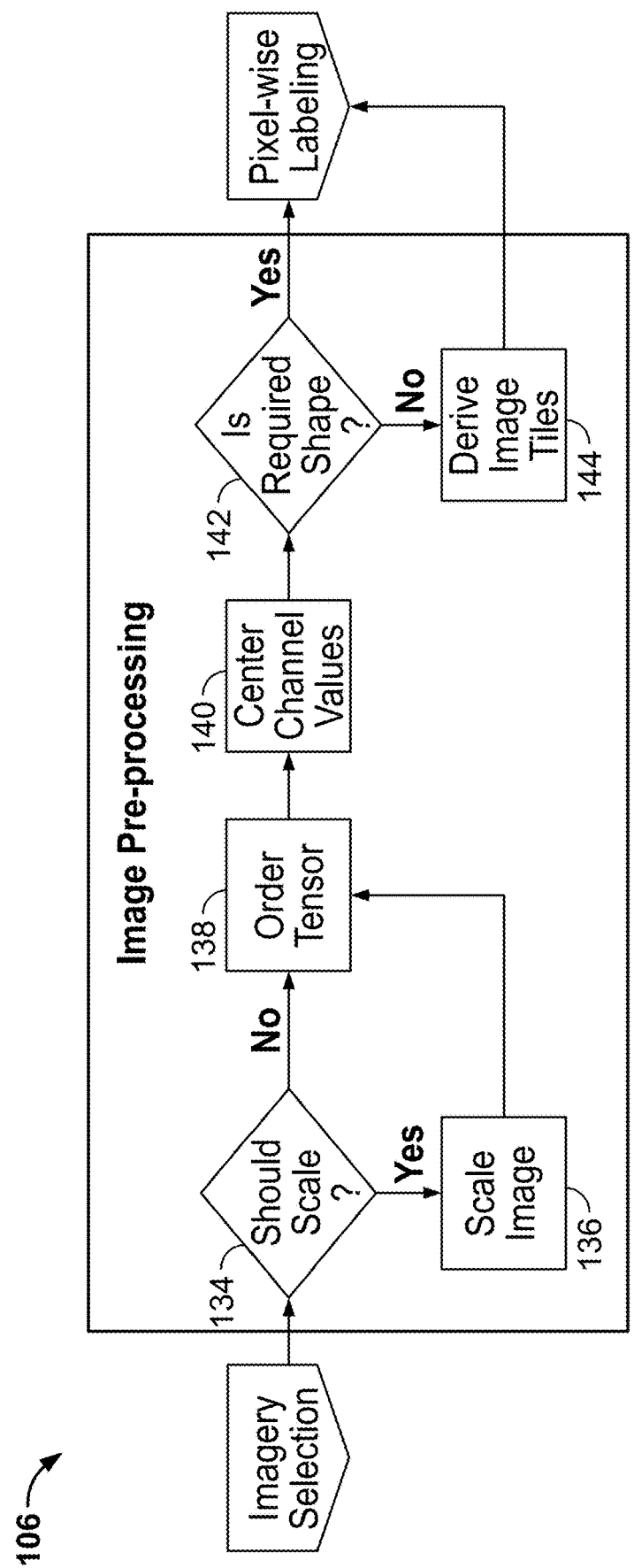
FIG. 12 is a flowchart illustrating the image pre-processing step of FIG. 10 in greater detail.

FIG. 12 is a flowchart illustrating the image pre-processing phase 106 of FIGS. 10-11 in greater detail. As noted above, the image pre-processing phase 106 can transform each selected image 118 into image tiles 122. Each image tile 122 can be formatted to satisfy the requirements of pixel-wise labeling models. Indeed, the system can use similar image pre-processing techniques as the techniques for training the pixel-wise labeling models. The operations required to transform the selected images to image tiles can be different for each pixel-wise labeling model. FIG. 12 shows a possible configuration of some image pre-processing operations suitable for preparing image tiles for use with convolutional neural network (CNN) models. The high-level operations could be reordered and still suitably transform the selected images to image tiles, although the low-level data manipulations could be different.

In step 134, the system makes a determination as to whether to scale an image. If the result is positive, the process proceeds to step 136 where the image is scaled. Scaling an image can, in some instances, provide greater efficiencies and better image quality during later phases, such as the pixel-wise labeling phase 108. Moreover, shrinking the image can lead to shorter processing times, since there are less pixels to process. Pixel-wise labeling models can be trained on annotated images at different scales so that shrinking the image will not drastically reduce the labeling quality. Further, shrinking the image can allow the model to take into account wider, yet high-level, visual context around each pixel. Scaling can be performed with an image rescale operation which interpolates between discrete pixel values, such as bilinear or bicubic interpolation. The system can scale down by up to 80%, however, other scaling parameters can be used in the system of the present disclosure. Scaling the image to multiple different sizes can be used to detect very large property features. Scaling the image can be thought of as zooming in or out. By zooming out more (e.g., scaling down more), the pixel-wise labeling model can take into account a wider context around each original pixel. Zooming out can be used to determine entire property features which cover a wide area, such as the contour of large commercial structures. By zooming in more (e.g., scaling down less), or even scaling up—the pixel-wise labeling model can take into account the local context around each original pixel. Zooming in can also be helpful to better detect the shape of a property feature, such as corners in building structure contours or arcs in pool contours.

After step 136, or if the result of 134 is negative, the process proceeds to step 138, wherein the system orders image tensors. The channel order of the image tensor can be organized to match the tensor format required by the pixel-wise labeling model. Image tensors cam include red, green, and blue component color channels (a.k.a. RGB) and can also include depth or near infrared channels. Image processing software libraries can organize the image channels differently when images are loaded into memory. For example, one library can order the color channels in RGB order and another in BGR order. Different image processing libraries can be used to train the pixel-wise labeling models and to then use the models. In that case, the image tensor's channels can be re-ordered once loaded to match the channel order required by the pixel-wise labeling model. The packing order of the image tensor can also match the pixel-wise labeling model tensor requirements. When loaded, image tensors can have an (h×w×c) packing order. In some cases, the system can run more efficiently when the pixel-wise labeling model works with tensors where the channels and spatial dimensions are transposed to (c×h×w). Although the transformed image tensor may no longer be directly visualized as an image, it can be called an image tensor since it is derived from the input image.

Figure 13:
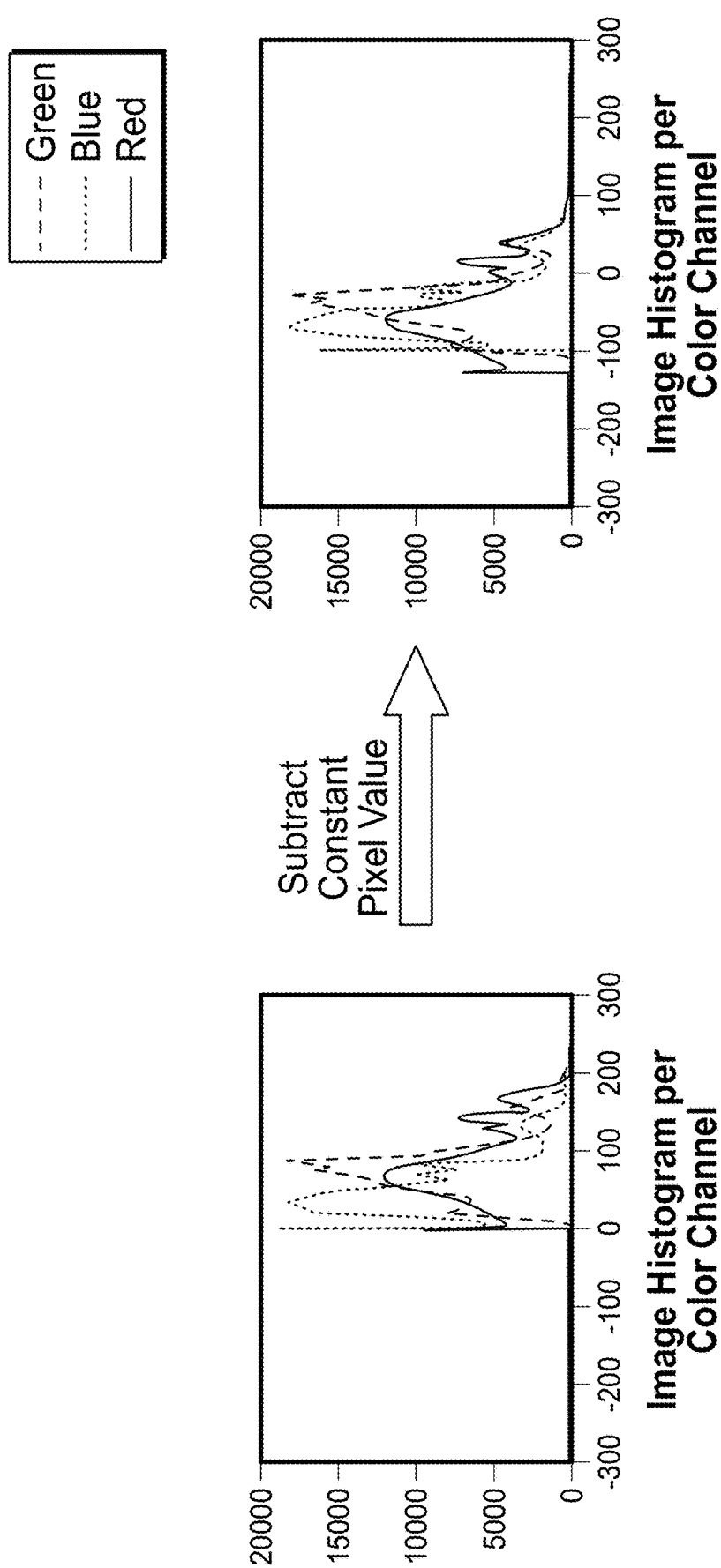
FIG. 13 depicts a pair of graphs illustrating how an image's red, green, and blue (RGB) color channels can be shifted by subtracting the general RGB mean values with respect to the non-geometric geospatial property feature detection and extraction system of the present disclosure.

After step 138, step 140 occurs, wherein the system centers channel values. The image tensor's values can be modified by subtracting a constant value from each channel. The per-channel constant values to subtract can be determined beforehand by calculating the arithmetic mean for the channel over a large set of aerial images which are representative of the images to be processed. Subtracting the general mean value effectively centers channel values on zero when applied over many images, but not necessarily for each individual image. FIG. 13 illustrates how an image's red, green, and blue (RGB) channels can be shifted by subtracting the general RGB mean values. Centering values around zero has a number of benefits for training and using convolutional neural networks for pixel-wise labeling. For example, centering values around zero is mathematically simple because it allows the neural network to generalize better to a variety of imagery sources. Also, it is more numerically stable since more floating point bits can be used for precision. Since the channel values can be centered when the neural network is trained, they can also be centered when the neural network is applied. As noted above, although the transformed image tensor may no longer be directly visualized as an image, it can be called an image tensor since it is derived from the input image.

Deriving image tiles in connection with FIG. 12 will now be explained in greater detail. After step 140, the process can proceed to step 142 where a determination is made as to whether the system requires a shape. If a negative determination is made, the process can proceed to step 144 where image tiles are derived. The image tensor can be expanded or sub-divided so that uniformly-shaped image tiles can be passed on to the pixel-labeling phase 108. The system can use uniformly-shaped input to enhance the next phase where convolutional neural networks are used for pixel-wise labeling. Doing so can save time and resources that would be needed to reconfigure the network for different shapes. Furthermore, doing so can ensure that the neural network can fit and run in memory. Accordingly, the system can expand smaller-than-required image tensors and sub-divide smaller-than-required image tensors into image tiles with a uniform shape. Images can be expanded or sub-divided such that each original pixel can be contained in one or more of the image tiles. Image expansion can be done by padding the original image with default "padding pixels"—for example, zeros in every channel—to all sides of the image. Other expansion methods, such as interpolation, could be used. If the system uses interpolation, the system can ensure that labels in label post-processing can be mapped back to the original pixels.

Figure 14:
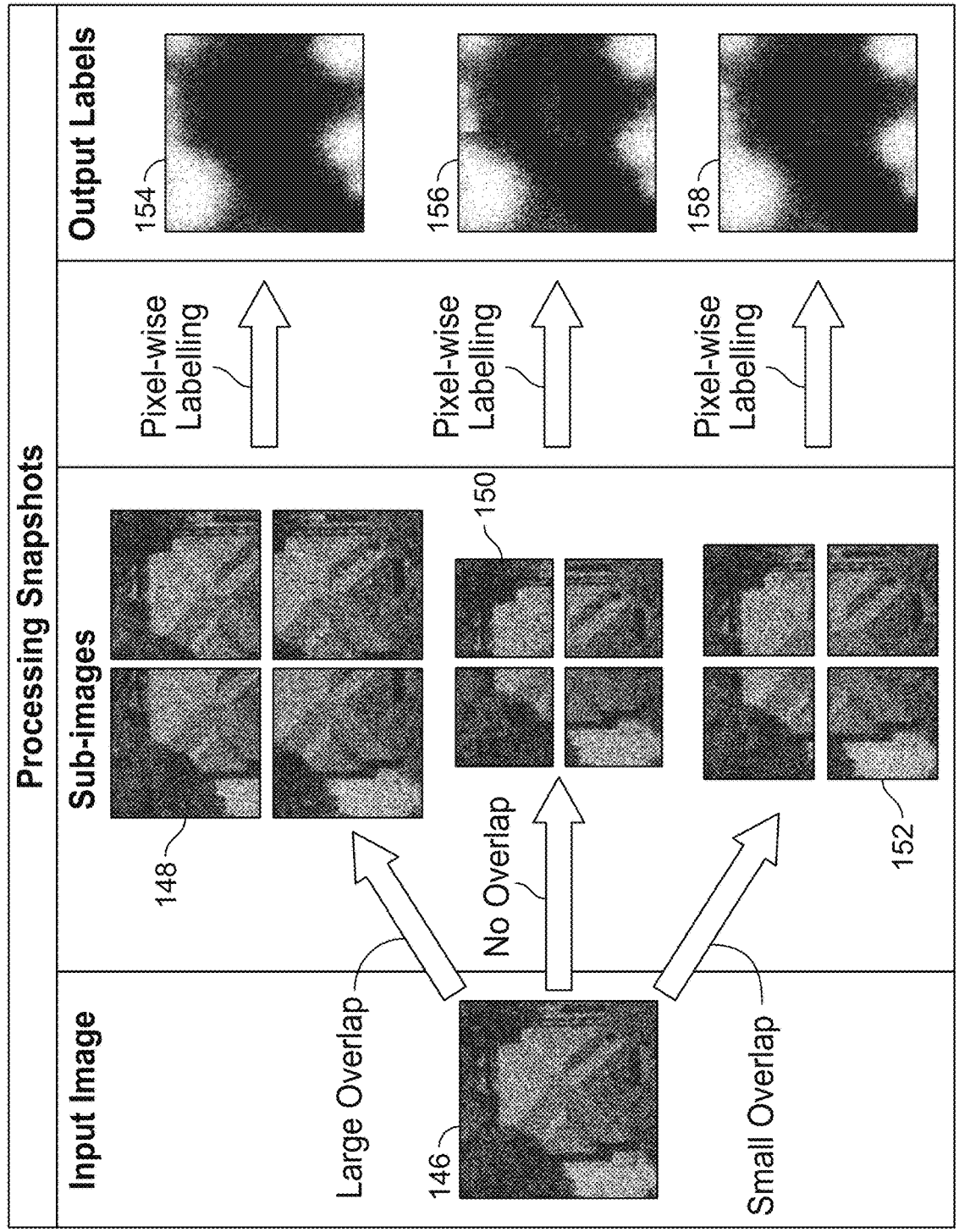
FIG. 14 illustrates image subdivision performed by the system by sliding a cropping window over the original image with respect to the non-geometric geospatial property feature detection and extraction system of the present disclosure.

FIG. 14 is a drawing illustrating image subdivision performed by the system by sliding a cropping window over the original image. It should be noted that image sub-division can be done in a variety of other ways, such as by using a visual attention mechanism to identify regions of the image where a particular property feature is more likely and then taking center crops around those regions of interest plus other crops needed to cover the whole image. FIG. 14 shows how an image might be sub-divided by sliding a cropping window from the top-left of the original image and using large overlaps 148, no overlaps 150, and small overlaps 152. The output labels can be derived from the pixel-wise labeling phase 108 and the post-processing phase 110 to stitch the label tiles together into one label tensor. Using large overlaps produces an output label 154 by processing some pixels multiple times. Using no overlap produces an output label 156 which can require padding odd-shaped windows. Using a small overlap can produce an output label 158. The pixels shared among sub-image tiles can be along the edge of a tile while also more in the center of another tile. Accordingly, when stitching label tiles in post-processing phase 110, the system can ignore the labels along tile edges and keep the labels in tile centers. Ideally, when the whole image is scaled in scale image step 136 of the process, it can be scaled to a size that will reduce the number of sub-image tiles that will be derived without drastically reducing labeling quality. As noted above, scaling down by up to 80% is preferable but not required by the present disclosure. The present disclosure can use any of the overlap methods, although the small overlap 152 is preferable and can reduce processing time in certain instances.

Figure 15:
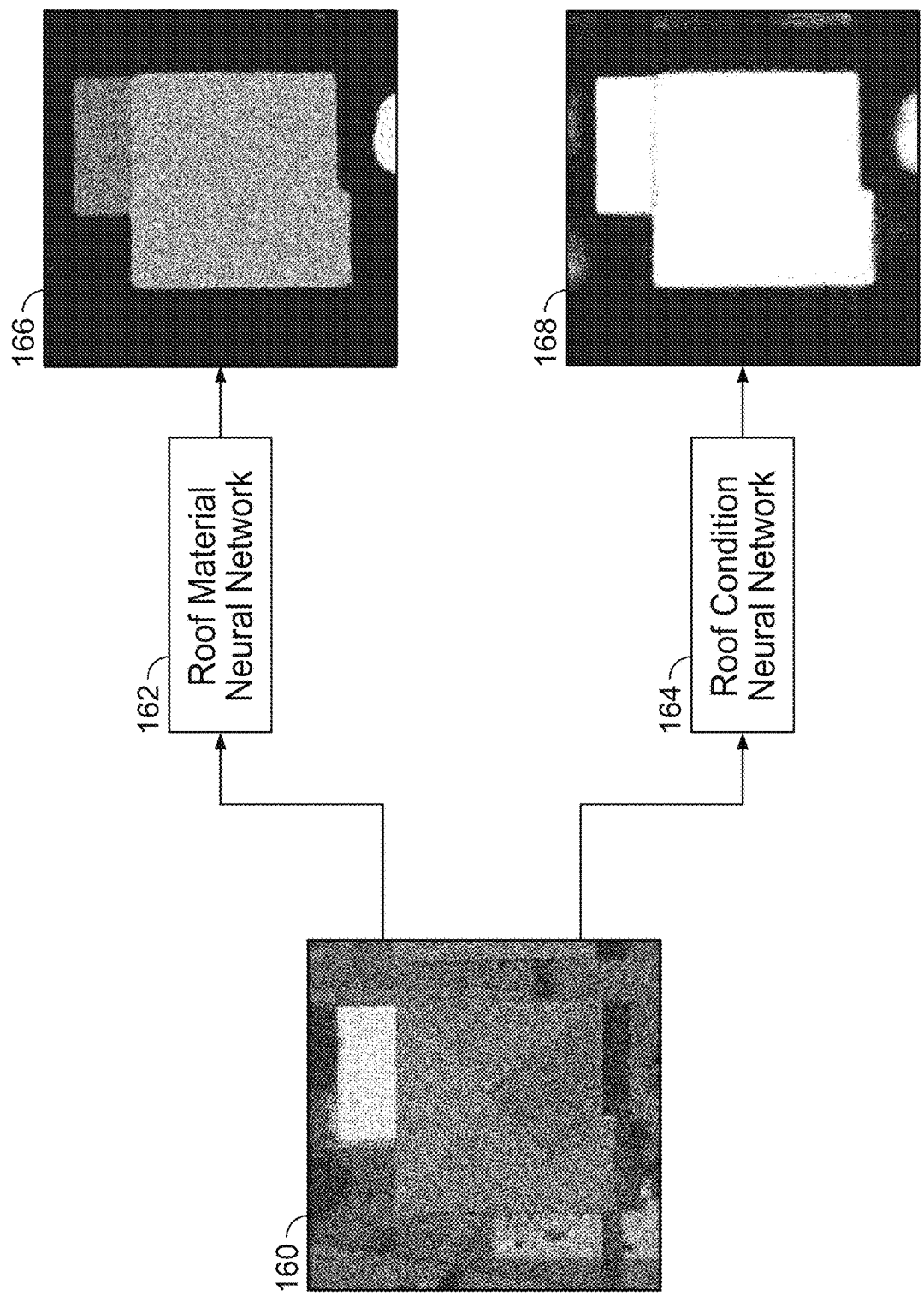
FIG. 15 illustrates an example output of pixel-wise labelling performed by the system with respect to the non-geometric geospatial property feature detection and extraction system of the present disclosure.

FIG. 15 illustrates pixel-wise labelling phase 108 in greater detail. The pixel-wise labeling phase 108 can produce labels for each pixel in an image tile, thus producing a label tile. Moreover, the pixel-wise labeling phase 108 can be done with any suitable computer vision model or algorithm which can predict a label for each pixel in the input image. Fully convolutional networks (FCNs) are neural networks which can be used for pixel-wise labeling since they can produce state-of-the-art results and automatically discover which image features are important or unimportant to a given task (provided enough annotated data and time to train). FCNs can be composed of multiple layers of operations that include, but are not limited to, convolution, pooling, non-linear activation functions, "deconvolution," and unpooling. One or more of the layers of the network can output a score label tensor, such as probability scores, which indicate how much each pixel belongs to each property feature. The pixel-wise labeling phase 108 can include one or more models, and each model can label one or more property features at a time. FIG. 15 shows an example of pixel-wise labeling for roof material and roof condition detection. The input image 160 can be processed by two independent FCNs, a roof material neural network 162 and a roof condition neural network 164. The roof material neural network 162 and the roof condition neural network 164 can produce score label tensors. The score label tensors can be visualized by mapping probability values on [0.0, 1.0] to gray-scale pixel values on [0, 255]. The roof material neural network 162 can produce an output 166 and the roof condition neural network 164 can produce an output 168. The system of the present disclose can also use one FCN to be trained to produce two label score tensors, one for roof materials and the other for roof condition.

Figure 16:
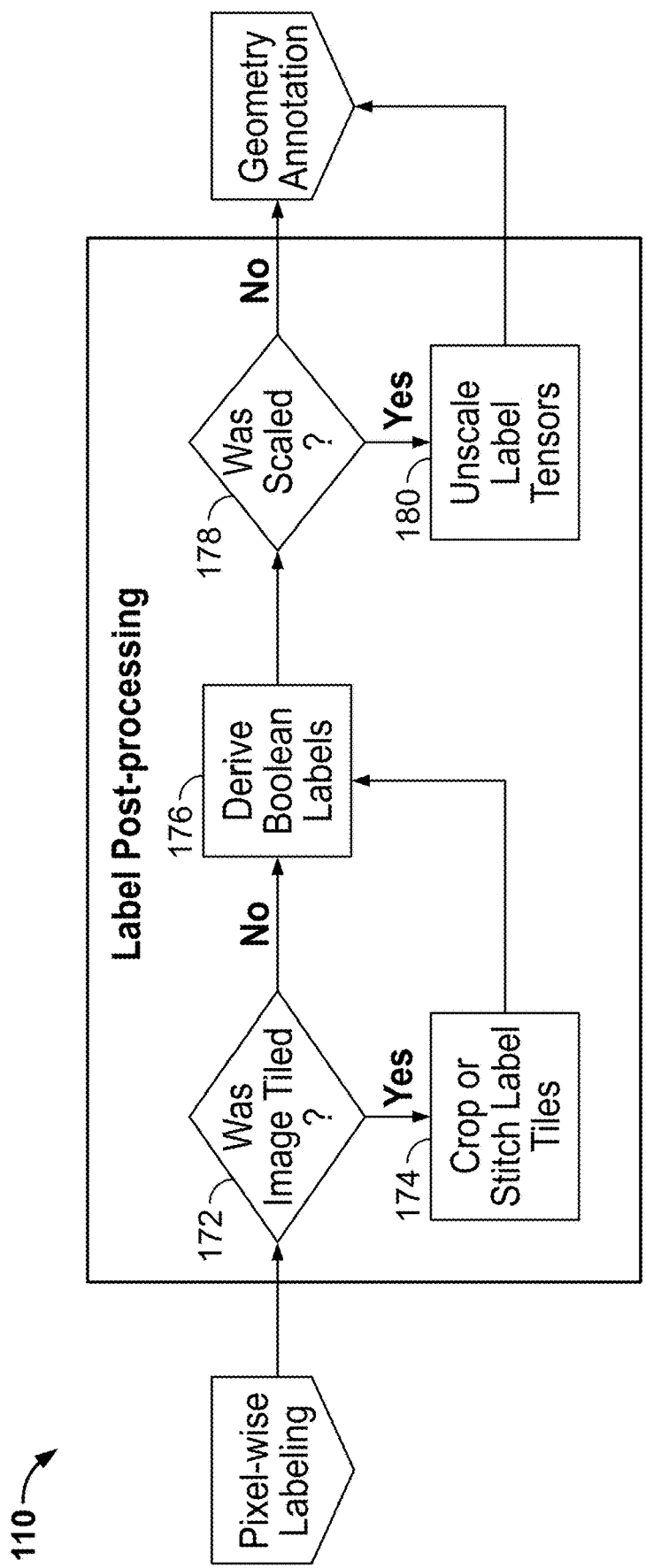
FIG. 16 is a flowchart illustrating the label post-processing step of FIG. 10 in greater detail.

FIG. 16 is a flowchart illustrating the label post-processing phase 110 of FIGS. 10-11 in greater detail. Label post-processing can transform the scores produced by the pixel-wise labeling networks for one or more image tiles into one label tensor for the original input image. Label post-processing can include three high-level operations: (1) crop or stitch label tensors, (2) derive Boolean label tensors, and (3) unscale label tensors. FIG. 16 shows a possible operation order, however, the present disclosure is not limited by this order and any order of the processing steps 70 can be carried out.

The process 110 can begin with step 172 in which a determination is made as to whether the image was tiled as discussed above. If a positive determination is made, the process can proceed to step 174 in which the label tiles can be cropped or stitched. The label tiles output by pixel-wise labeling can be cropped or stitched together to produce a single label tensor for the possibly scaled input image. Cropping a label tile so as to ignore padding pixels is the inverse operation to expanding an image during the image pre-processing phase 106 as discussed in detail above.

Stitching multiple label tiles together is the inverse operation to sub-dividing an image during the image pre-processing phase 106 as discussed in greater detail above. There are various stitching algorithms which operate pixel-by-pixel, including, for example: (1) average all of the scores for the pixel from the various label tiles, or (2) use the score from the label tile in which the pixel is most in the center of the tile, or (3) as a combination of 1 and 2: average the scores for the pixel from label tiles where the pixel is not close to the edge of the tile.

Figure 17:
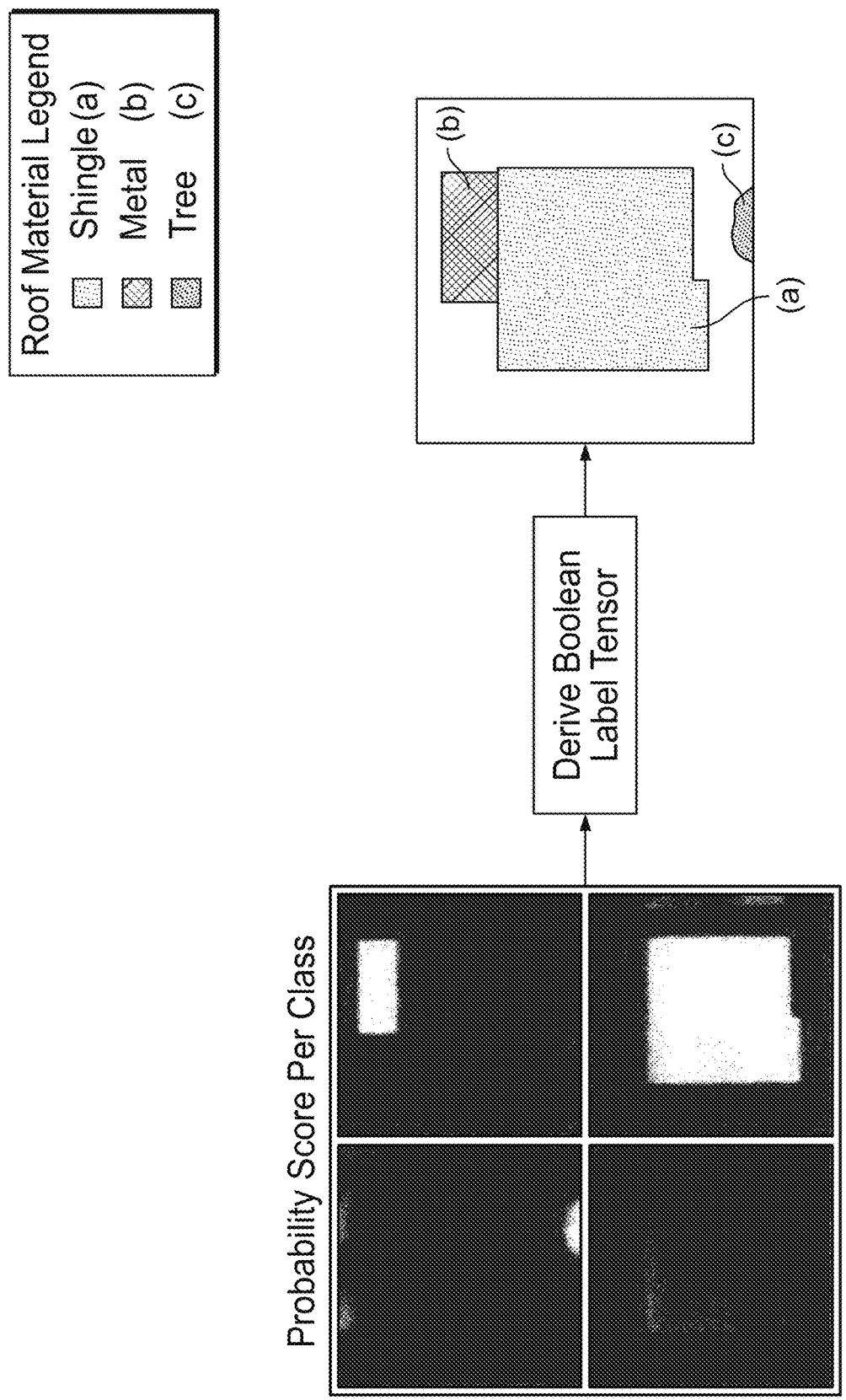
FIG. 17 illustrates a sample output from the label post processing phase of FIG. 10 in greater detail.

After step 174, or if a negative determination was made in step 172, the process can proceed to step 176 in which Boolean labels can be derived. The score label tiles can be converted to Boolean label tensors using a threshold operation. For each property feature, the pixel can be labeled as being "part-of" a property feature instance if the pixel's score is above a threshold value and otherwise can be labeled as "not-part-of" the property feature if the score is below the threshold. FIG. 17 illustrates how shingle, metal, and tree probabilities (labelled (a), (b), and (c) respectively) can be converted to shingle, metal and tree labels using an example threshold of 0.5 (or equivalently, an argmax operation). Probabilities can be visualized by mapping 0.0 to black, 1.0 to white, and values in between to levels of gray. The brighter a pixel is the more likely it is to be a part of a property feature instance. Pixels that have "not-part-of" labels can be visualized as black and pixels that have "part-of" labels can be visualized as white. As can be seen in FIG. 17, a visualization of probabilities can be a noisy representation of property features but the output of the Boolean label tensor can be crisp and distinct.

With reference back to FIG. 16, after step 176, the process can proceed to step 178 where a determination can be made as to whether the image was scaled. If a positive determination is made, the process can proceed to step 180 where label tensors can be unscaled. The label tensor can be unscaled to assign a label to each pixel in the whole input image if it had been scaled during the image pre-processing phase 106. To unscale the label tensor, the system can scale the image in reverse from when it was scaled during image scaling. In particular, if the image was shrunk in the prior steps then the labels can be expanded, and if the image was expanded in the prior steps, then the labels can be shrunk. Unscaling a score label tensor can be done by interpolating the score values, similar to how the image was scaled by interpolating pixel values, or can be done with a nearest neighbor approach. Unscaling a Boolean label tensor can be done using a nearest neighbor approach, instead of interpolation, so that the labels remain as binary "part-of" of the feature and "not-part-of" feature values. If the image is processed at multiple scales, then the label tensors can be combined into a single label tensor. The combination can be done in a variety of ways, including: applying a bit-wise OR operation to Boolean label tensors, or doing a weighted combination of score label tensors, such as with a linear combination or with a soft-max function.

Figure 18:
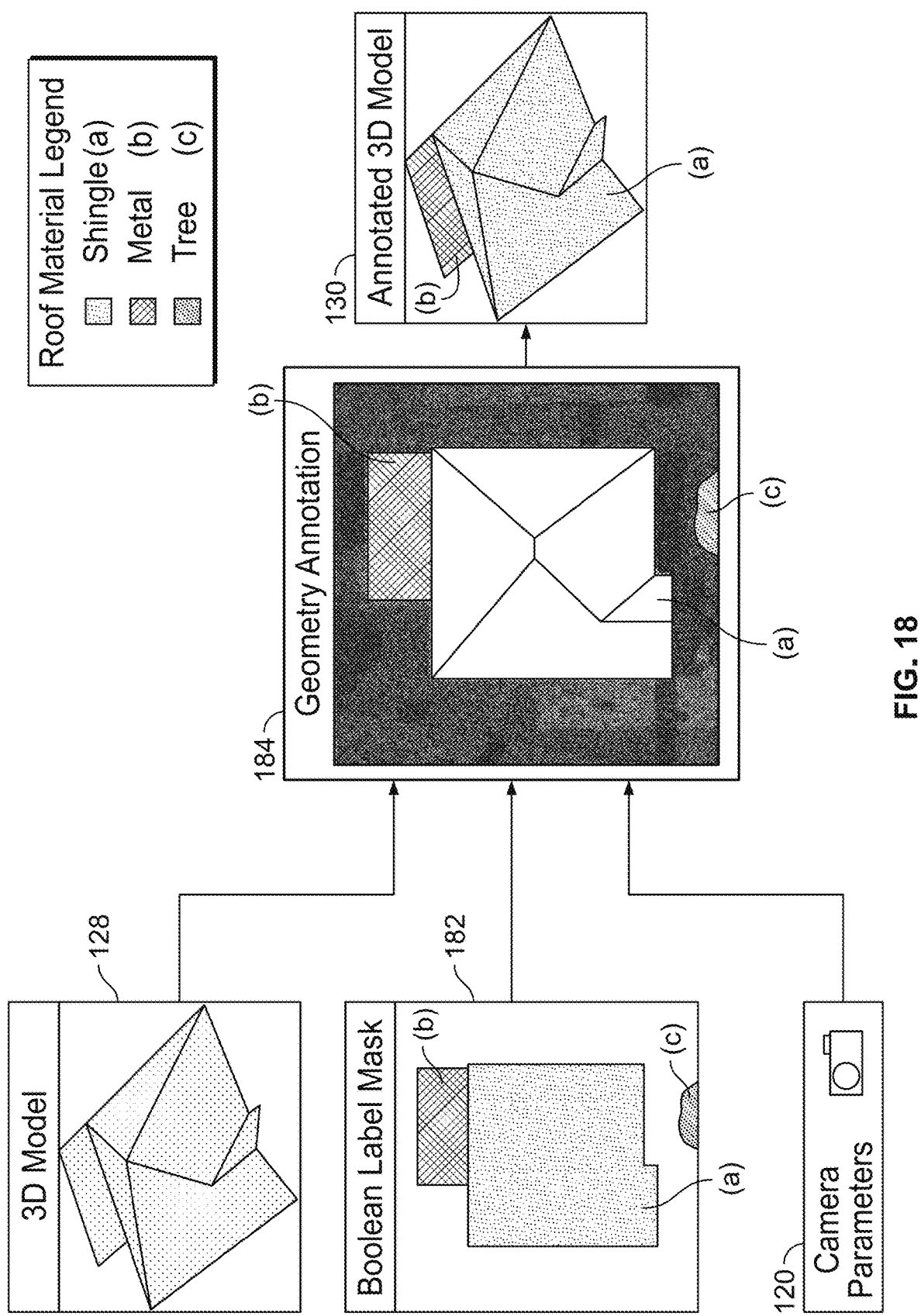
FIG. 18 is a drawing illustrating the geometry annotation phase of FIG. 10 in greater detail.

FIG. 18 is a drawing illustrating the geometry annotation phase 112 of the present disclosure. The geometry annotation phase 112 can extract annotations from the label tensor and apply them to selected 3D models. The geometry annotation phase 112 can take as input one or more three dimensional models 128. The one or more three dimensional models 128 can be selected by intersecting them with the input region of interest. The geometry annotation phase 112 can also take the image metadata 120 as input along with a Boolean label mask 182 which was produced in the previous process steps as discussed in greater detail above. The geometry annotation phase 112 can be executed for each of the one or more three dimensional models 128. The goal of the geometry annotation phase 112 can be to annotate each roof face with a roof material classification as can be seen in the annotated image 184. The geometry annotation phase 112 can take the 3D model geometry and projects that into image space using the image metadata 120. The geometry annotation phase 112 can then perform a label count for each roof face by adding the number of labeled pixels per classification contained in the projected roof face. The geometry annotation phase 112 can also eliminate pixels that contributed to the count for a roof faces that are obstructed from the camera's point of view. This can be done using z-buffering. The final annotation for each roof face can be defined as the classification with the highest pixel count. For example, as can be seen in FIG. 18, the primary structure's roof faces all project onto mostly pixels which corresponds to the shingle material, labelled (a). Once this is completed, the annotations can be projected onto an annotated 3D model 130.

Figure 19:
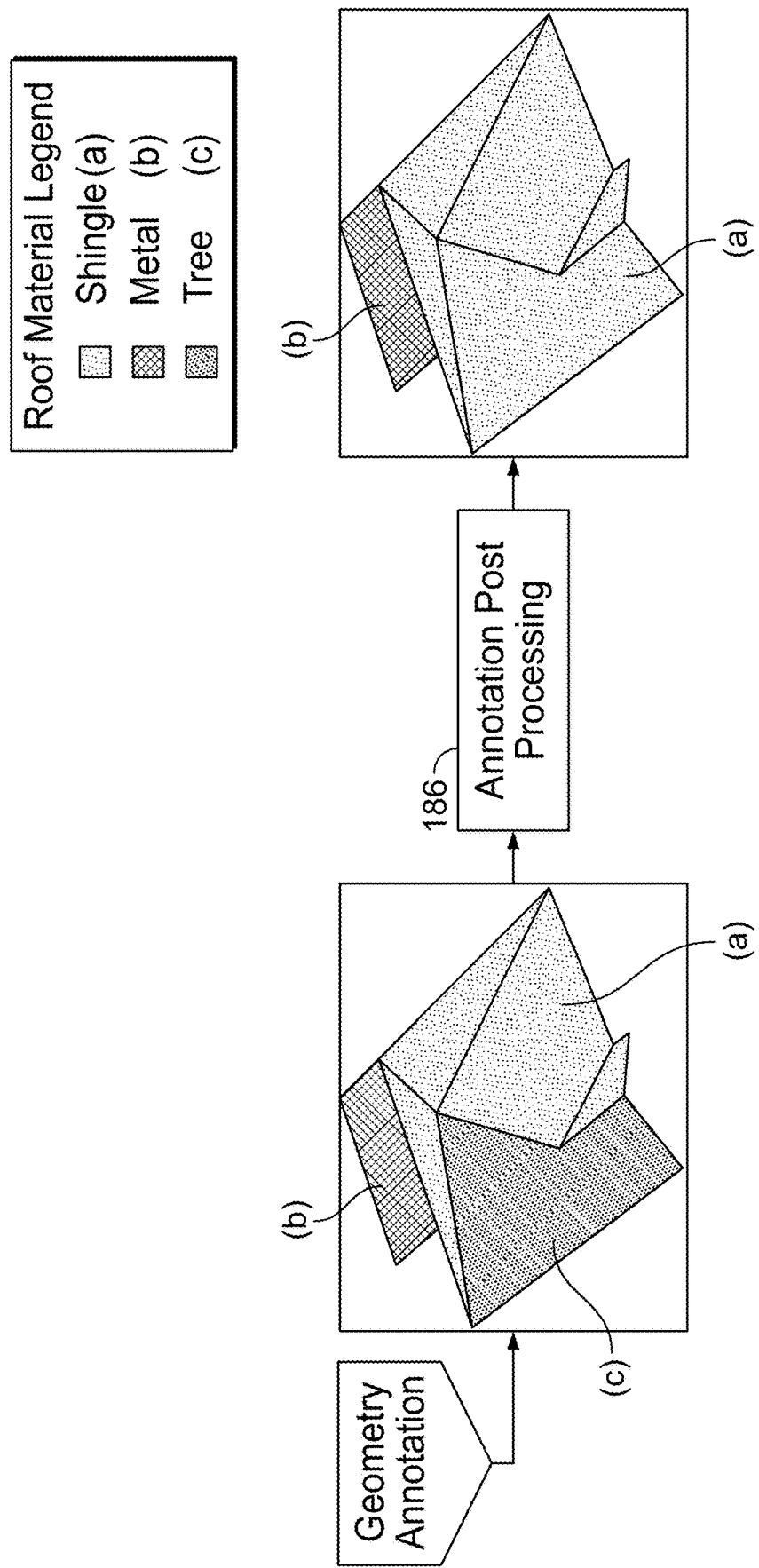
FIG. 19 is a drawing illustrating a geometry annotation post processing phase with respect to the non-geometric geospatial property feature detection and extraction system of the present disclosure.

FIG. 19 is a drawing illustrating geometry annotation post processing phase 186. Depending on the annotation type it can be desirable to run post-processing in order to eliminate certain undesirable annotations. The annotation post processing phase 186 can take as input the annotated three dimensional model 130 generated as discussed in greater detail above. As an example with respect to roof materials, it can be very uncommon for a connected roof structure to have varying material types. If the geometry annotation post processing phase 186 finds roof face annotations that disagree with the majority of the other annotations, the system can adjust those that are in disagreement. As can be seen in an example in FIG. 19, a roof face which is be covered mostly by pixels labeled as tree (c) which is inconsistent with its connected roof faces (shingles (a)), can adjust the tree label to be a shingle material to match the labels of the connected roof faces.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. A computer vision system for detecting and extracting geometric features from digital images, comprising:
   at least one computer system; and
   computer vision system code executed by the at least one computer system, the computer vision system code causing the computer system to:
   select a geospatial region of interest;
   select and retrieve at least one digital image associated with the geospatial region of interest;
   generate a plurality of image tiles from the at least one digital image;
   generate a plurality of label tiles from the plurality of image tiles;
   combine the plurality of label tiles into a single labeling for the at least one digital image; and
   extract two dimensional ("2D") representations of geometric features from the at least one digital image using the single labeling, wherein the plurality of label tiles comprise a score label tensor or a Boolean label tensor.

2. The computer vision system of claim 1, wherein the computer vision system code further causes the computer system to retrieve metadata associated with the at least one digital image, and extract the 2D representations of the geometric features using the metadata.

3. The computer vision system of claim 2, wherein the metadata comprises intrinsic parameters and extrinsic parameters of a camera used to capture the at least one digital image.

4. The computer vision system of claim 1, wherein the computer system uses a fully convolutional network to generate the plurality of label tiles.

5. The computer vision system of claim 1, wherein the computer vision system code further causes the computer system to combine the plurality of label tiles into the single labeling using one or more operations including, cropping or stitching the plurality of label tiles, deriving Boolean labels, and unscaling label tensors.

6. The computer vision system of claim 1, wherein process of extracting 2D representations of geometric features comprises the computer vision system code causing the computer system to:
extract vector data which represents a property feature in pixel space; and
project the vector data to world coordinates.

7. The computer vision system of claim 1, wherein the geometric features correspond to property features.

8. A method for detecting and extracting geometric features from digital images, comprising the steps of:
selecting a geospatial region of interest;
selecting and retrieving at least one digital image associated with the geospatial region of interest;
generating a plurality of image tiles from the at least one digital image;
generating a plurality of label tiles from the plurality of image tiles;
combining the plurality of label tiles into a single labeling for the at least one digital image; and
extracting two dimensional ("2D") representations of geometric features from the at least one digital image using the single labeling,
wherein the plurality of label tiles comprise a score label tensor or a Boolean label tensor.

9. The method of claim 8, further comprising retrieving metadata associated with the at least one digital image and extracting the 2D geospatial representations of the geometric features using the metadata.

10. The method of claim 9, wherein the metadata comprises intrinsic parameters and extrinsic parameters of a camera used to capture the at least one digital image.

11. The method of claim 8, wherein the computer system uses a fully convolutional network to generate the plurality of label tiles.

12. The method of claim 8, wherein combining the plurality of label tiles into the single labeling using one or more operations includes, cropping or stitching the plurality of label tiles, deriving Boolean labels, and unscaling label tensors.

13. The method of claim 8, wherein step of extracting 2D representations of geometric features comprises:
extracting vector data which represents a property feature in pixel space; and
projecting the vector data to world coordinates.

14. The method of claim 8, wherein the geometric features correspond to property features.

15. A computer vision system for detecting and extracting non-geometric features from digital images, comprising:
at least one computer system; and
computer vision system code executed by the at least one computer system, the computer vision system code causing the computer system to:
select a geospatial region of interest;
select and retrieve at least one digital image associated with the geospatial region of interest;
generate a plurality of image tiles from the at least one digital image;
generate a plurality of label tiles from the plurality of image tiles;
combine the plurality of label tiles into a single labeling for the at least one digital image; and
generate annotated models corresponding to the non-geometric features using the single labeling,
wherein the plurality of label tiles are one of a score label tensor or a Boolean label tensor.

16. The computer vision system of claim 15, wherein the computer vision system code further causes the computer system to retrieve metadata associated with the at least one digital image, and generate the annotated models corresponding to the non-geometric features using the metadata.

17. The computer vision system of claim 16, wherein the metadata comprises intrinsic parameters and extrinsic parameters of a camera used to capture the at least one digital image.

18. The computer vision system of claim 15, wherein the computer system uses a fully convolutional network to generate the plurality of label tiles.

19. The computer vision system of claim 15, wherein the computer vision system code further causes the computer system to combine the plurality of label tiles into the single labeling using one or more operations which include, cropping or stitching the plurality of label tiles, deriving Boolean labels, and unscaling label tensors.

20. The computer vision system of claim 15, wherein process of generate annotated models corresponding to the non-geometric features comprises the computer vision system code causing the computer system to extract annotations from the single labeling and apply the annotations to the one or more of the annotated models.

21. The computer vision system of claim 15, wherein the annotated model comprises a three-dimensional ("3D") model.

22. A method for detecting and extracting non-geometric features from digital images, comprising the steps of:
selecting a geospatial region of interest;
selecting and retrieving at least one digital image associated with the geospatial region of interest;
generating a plurality of image tiles from the at least one digital image;
generating a plurality of label tiles from the plurality of image tiles;
combining the plurality of label tiles into a single labeling for the at least one digital image; and
generating annotated models corresponding to the non-geometric features using the single labeling,
wherein the plurality of label tiles are one of a score label tensor or a Boolean label tensor.

23. The method of claim 22, further comprising retrieving metadata associated with the at least one digital image and generating the annotated models corresponding to the non-geometric features using the metadata.

24. The method of claim 23, wherein the metadata comprises intrinsic parameters and extrinsic parameters of a camera used to capture the at least one digital image.

25. The method of claim 22, wherein the computer system uses a fully convolutional network to generate the plurality of label tiles.

26. The method of claim 22, wherein combining the plurality of label tiles into the single labeling using one or more operations includes, cropping or stitching the plurality of label tiles, deriving Boolean labels, and unscaling label tensors.

27. The system of claim 22, wherein step of generating the annotated models corresponding to the non-geometric features comprises extracting annotations from the single labeling and applying the annotations to the one or more of the annotated models.

28. The method of claim 22, wherein the annotated model comprises a three-dimensional ("3D") model.

29. A computer vision system for detecting and extracting geometric features from digital images, comprising:
at least one computer system; and
computer vision system code executed by the at least one computer system, the computer vision system code causing the computer system to:
select a geospatial region of interest;
select and retrieve at least one digital image associated with the geospatial region of interest;
generate a plurality of image tiles from the at least one digital image;
generate a plurality of label tiles from the plurality of image tiles;
combine the plurality of label tiles into a single labeling for the at least one digital image; and
extract two dimensional ("2D") representations of geometric features from the at least one digital image using the single labeling by extracting vector data which represents a property feature in pixel space and projecting the vector data to world coordinates.

30. The computer vision system of claim 28, wherein the computer vision system code further causes the computer system to retrieve metadata associated with the at least one digital image, and extract the 2D representations of the geometric features using the metadata.

31. The computer vision system of claim 29, wherein the metadata comprises intrinsic parameters and extrinsic parameters of a camera used to capture the at least one digital image.

32. The computer vision system of claim 28, wherein the computer system uses a fully convolutional network to generate the plurality of label tiles.

33. The computer vision system of claim 28, wherein the computer vision system code further causes the computer system to combine the plurality of label tiles into the single labeling using one or more operations including, cropping or stitching the plurality of label tiles, deriving Boolean labels, and unscaling label tensors.

34. The computer vision system of claim 28, wherein the geometric features correspond to property features.

35. A method for detecting and extracting geometric features from digital images, comprising the steps of:
selecting a geospatial region of interest;
selecting and retrieving at least one digital image associated with the geospatial region of interest;
generating a plurality of image tiles from the at least one digital image;
generating a plurality of label tiles from the plurality of image tiles;
combining the plurality of label tiles into a single labeling for the at least one digital image; and
extracting two dimensional ("2D") representations of geometric features from the at least one digital image using the single labeling by extracting vector data which represents a property feature in pixel space and projecting the vector data to world coordinates.

36. The method of claim 35, further comprising retrieving metadata associated with the at least one digital image and extracting the 2D geospatial representations of the geometric features using the metadata.

37. The method of claim 36, wherein the metadata comprises intrinsic parameters and extrinsic parameters of a camera used to capture the at least one digital image.

38. The method of claim 35, wherein the computer system uses a fully convolutional network to generate the plurality of label tiles.

39. The method of claim 35, wherein combining the plurality of label tiles into the single labeling using one or more operations includes, cropping or stitching the plurality of label tiles, deriving Boolean labels, and unscaling label tensors.

40. The method of claim 35, wherein the geometric features correspond to property features.

41. A computer vision system for detecting and extracting non-geometric features from digital images, comprising:
at least one computer system; and
computer vision system code executed by the at least one computer system, the computer vision system code causing the computer system to:
select a geospatial region of interest;
select and retrieve at least one digital image associated with the geospatial region of interest;
generate a plurality of image tiles from the at least one digital image;
generate a plurality of label tiles from the plurality of image tiles;
combine the plurality of label tiles into a single labeling for the at least one digital image; and
generate annotated models corresponding to the non-geometric features using the single labeling by extracting annotations from the single labeling and applying the annotations to the one or more of the annotated models.

42. The computer vision system of claim 41, wherein the computer vision system code further causes the computer system to retrieve metadata associated with the at least one digital image, and generate the annotated models corresponding to the non-geometric features using the metadata.

43. The computer vision system of claim 42, wherein the metadata comprises intrinsic parameters and extrinsic parameters of a camera used to capture the at least one digital image.

44. The computer vision system of claim 41, wherein the computer system uses a fully convolutional network to generate the plurality of label tiles.

45. The computer vision system of claim 41, wherein the computer vision system code further causes the computer system to combine the plurality of label tiles into the single labeling using one or more operations which include, cropping or stitching the plurality of label tiles, deriving Boolean labels, and unscaling label tensors.

46. The computer vision system of claim 41, wherein the annotated model comprises a three-dimensional ("3D") model.

47. A method for detecting and extracting non-geometric features from digital images, comprising the steps of:

selecting a geospatial region of interest;
selecting and retrieving at least one digital image associated with the geospatial region of interest;
generating a plurality of image tiles from the at least one digital image;
generating a plurality of label tiles from the plurality of image tiles;
combining the plurality of label tiles into a single labeling for the at least one digital image; and
generating annotated models corresponding to the non-geometric features using the single labeling by extracting annotations from the single labeling and applying the annotations to the one or more of the annotated models.

48. The method of claim 47, further comprising retrieving metadata associated with the at least one digital image and generating the annotated models corresponding to the non-geometric features using the metadata.

49. The method of claim 48, wherein the metadata comprises intrinsic parameters and extrinsic parameters of a camera used to capture the at least one digital image.

50. The method of claim 47, wherein the computer system uses a fully convolutional network to generate the plurality of label tiles.

51. The method of claim 47, wherein combining the plurality of label tiles into the single labeling using one or more operations includes, cropping or stitching the plurality of label tiles, deriving Boolean labels, and unscaling label tensors.

52. The method of claim 47, wherein the annotated model comprises a three-dimensional ("3D") model.

* * * * *